(12) United States Patent
Wakatsu et al.

(10) Patent No.: US 10,254,687 B2
(45) Date of Patent: Apr. 9, 2019

(54) FIXING APPARATUS AND IMAGE FORMING APPARATUS THAT MAINTAIN A PRESSING FORCE BETWEEN A CONTACT MEMBER AND A HEAT ROTATING MEMBER

(71) Applicant: CANON KABUSHIKI KAISHA, Tokyo (JP)

(72) Inventors: Kohei Wakatsu, Kawasaki (JP); Takashi Narahara, Mishima (JP); Takeshi Shinji, Yokohama (JP); Kazuhiro Doda, Yokohama (JP); Yutaka Sato, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/016,046

(22) Filed: Jun. 22, 2018

(65) Prior Publication Data

US 2018/0373189 A1 Dec. 27, 2018

(30) Foreign Application Priority Data

Jun. 23, 2017 (JP) .................................. 2017-123168

(51) Int. Cl.
*G03G 15/20* (2006.01)
*H04N 1/00* (2006.01)

(52) U.S. Cl.
CPC ..... *G03G 15/2028* (2013.01); *G03G 2215/20* (2013.01); *H04N 1/00986* (2013.01)

(58) Field of Classification Search
USPC ................ 399/107, 110, 122, 320, 328–332; 219/216, 619
See application file for complete search history.

(56) References Cited

U.S. PATENT DOCUMENTS

| 7,668,494 | B2* | 2/2010 | Kubo ................. G03G 15/2032 399/328 |
| 8,447,219 | B2* | 5/2013 | Furukata ............ G03G 15/2064 399/329 |
| 8,971,744 | B2 | 3/2015 | Nihonyanagi et al. |
| 9,229,388 | B2 | 1/2016 | Imaizumi et al. |
| 9,507,303 | B2 | 11/2016 | Imaizumi et al. |
| 9,983,522 | B2 | 5/2018 | Imaizumi et al. |

FOREIGN PATENT DOCUMENTS

JP 2013029728 A 2/2013

* cited by examiner

*Primary Examiner* — Hoan Tran
(74) *Attorney, Agent, or Firm* — Venable LLP

(57) ABSTRACT

A fixing apparatus includes a heating rotating member, a pressure rotating member, and a contact member. A contact holding member holds the contact member so that the contact member presses against the heating rotating member, and causes at least a portion of the contact member to elastically deform between the heating rotating member and the contact holding member. In addition, a displacement mechanism displaces a relative position of the heating rotating member with respect to the pressure rotating member. When the heating rotating member is separated from the pressure rotating member by the displacement mechanism, an interval between a fulcrum, at which the contact holding member holds the contact member, and a contact point, at which the contact member comes into contact with the heating rotating member, does not increase.

16 Claims, 20 Drawing Sheets

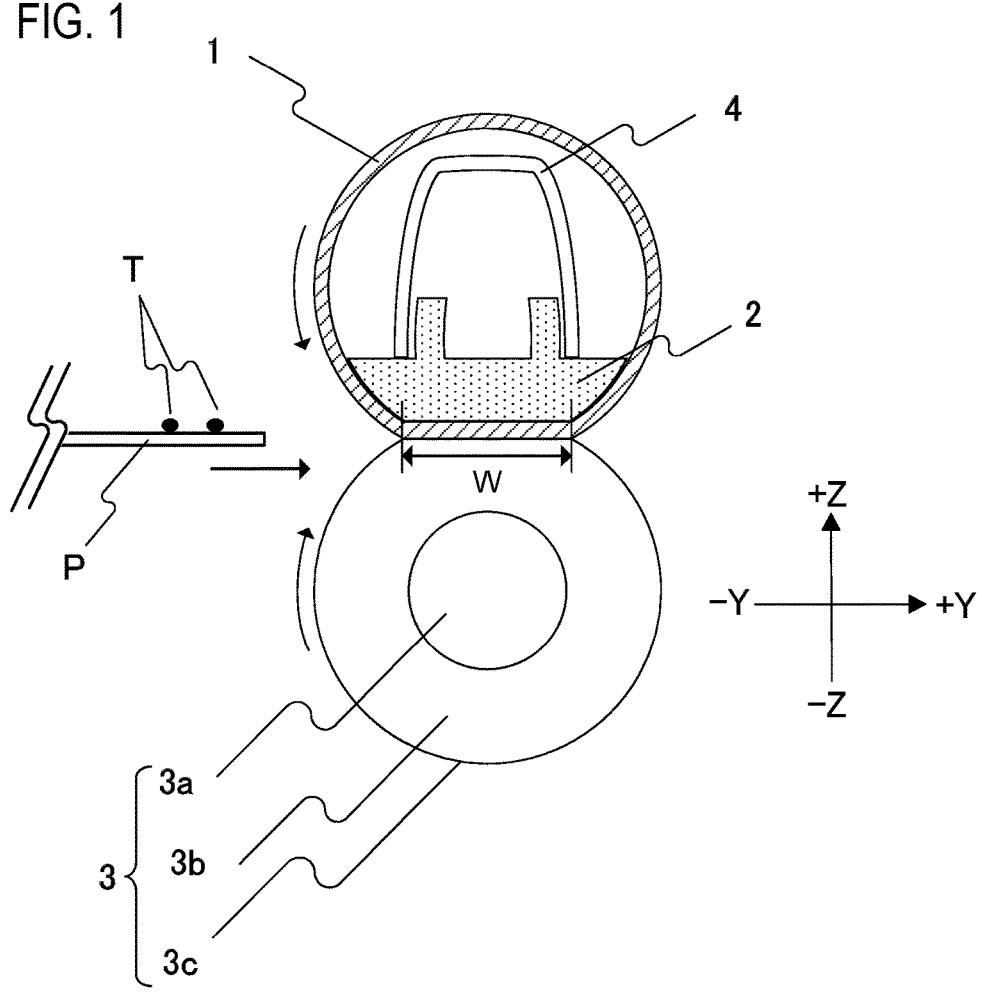

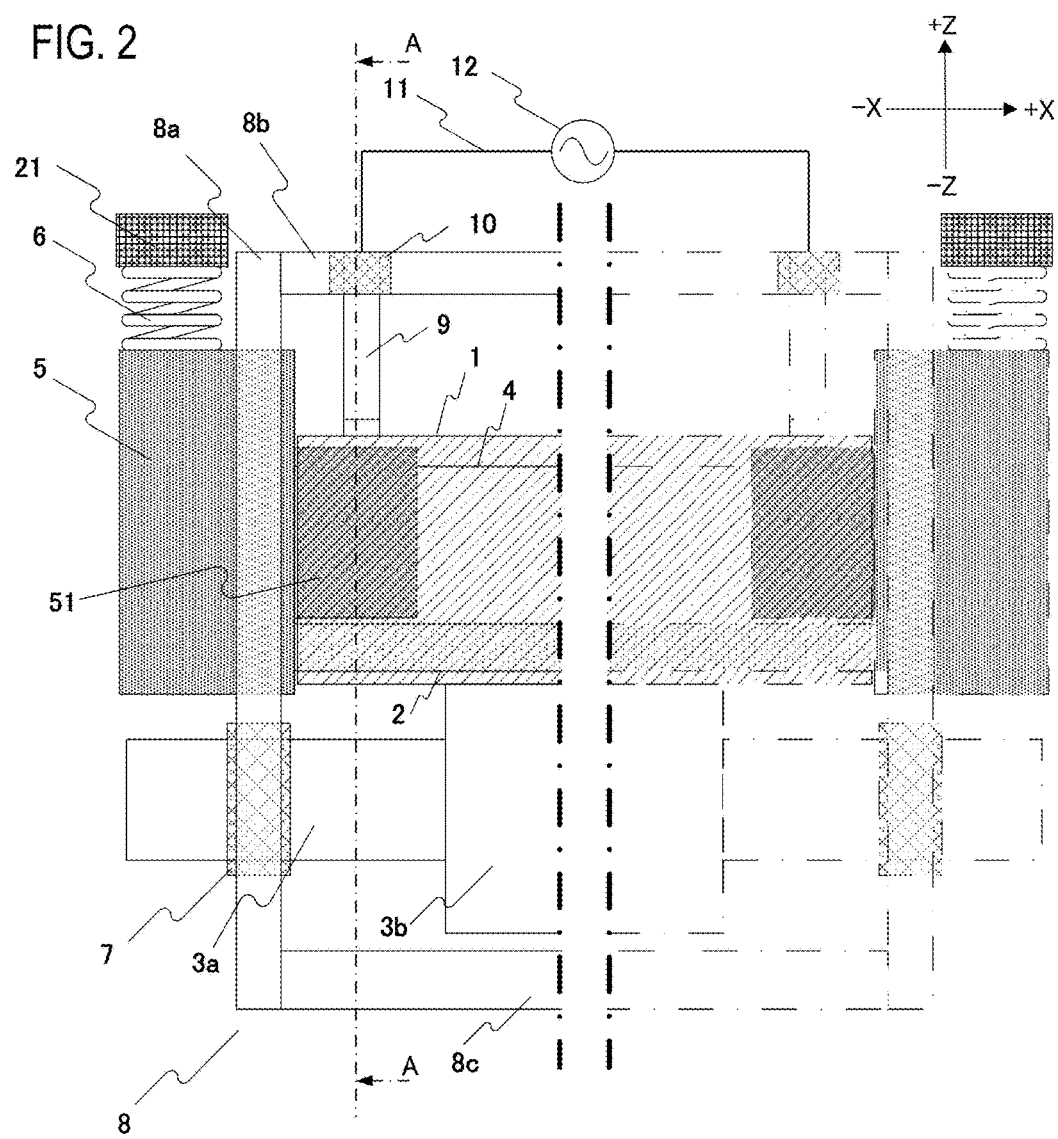

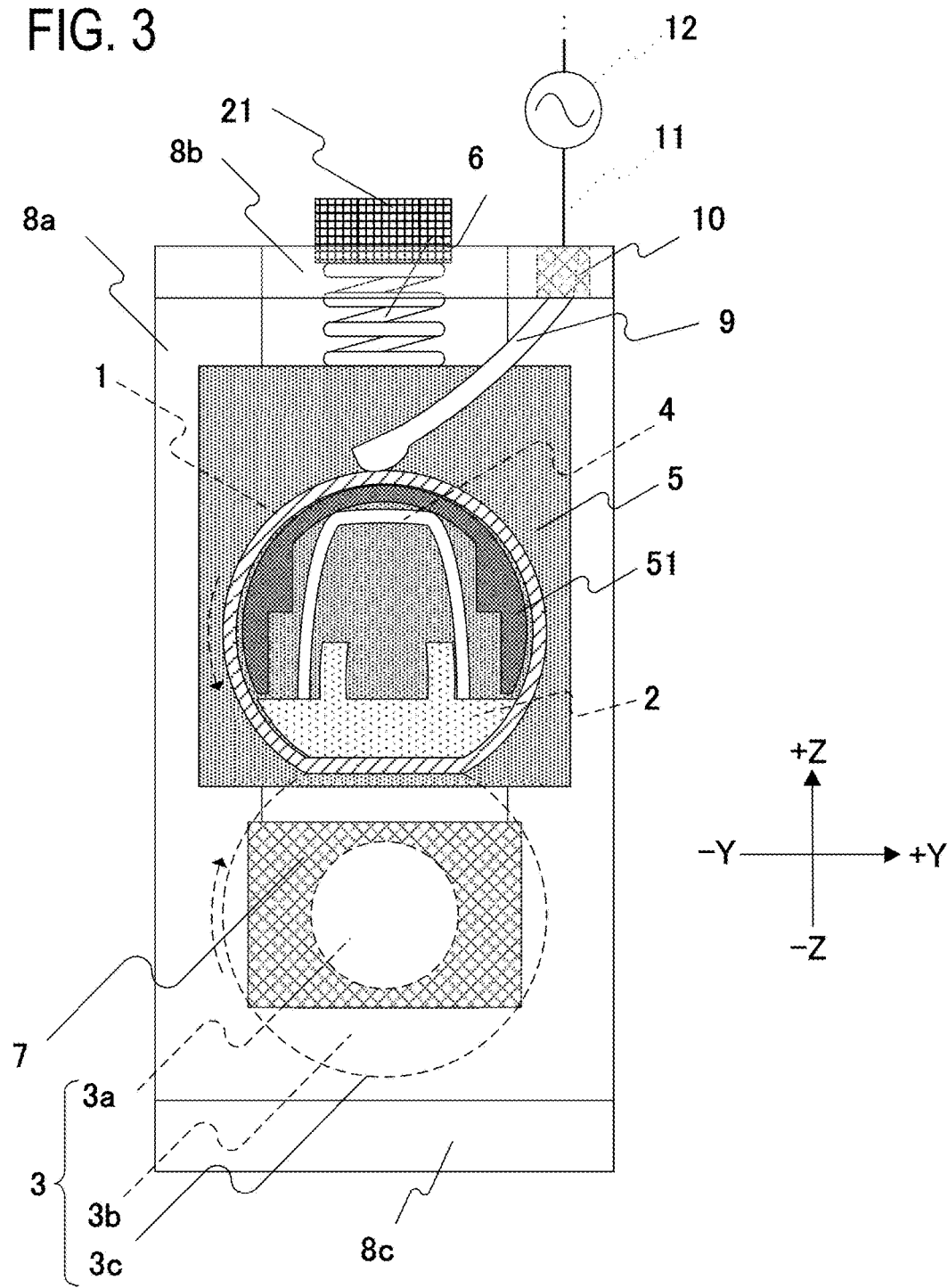

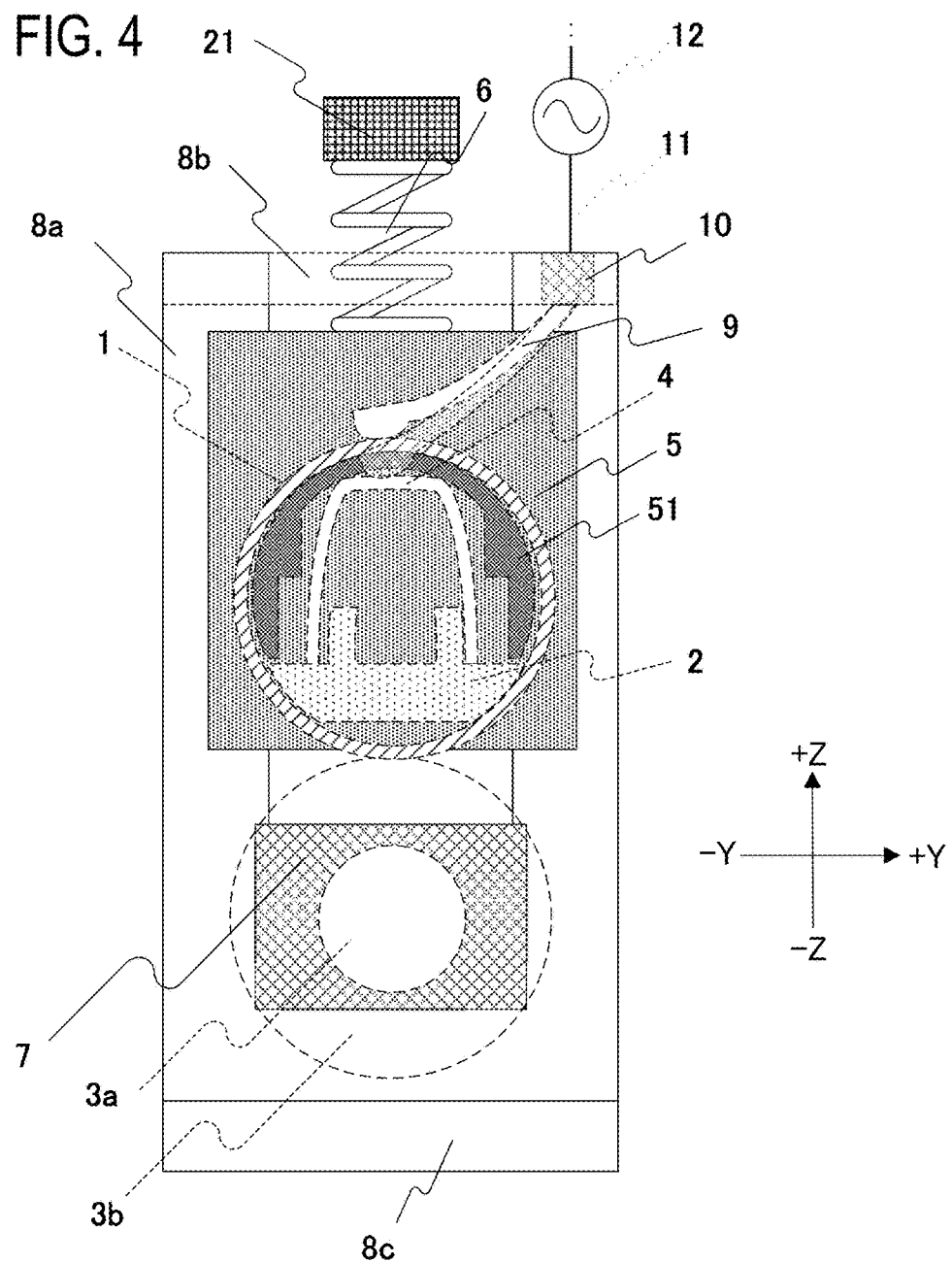

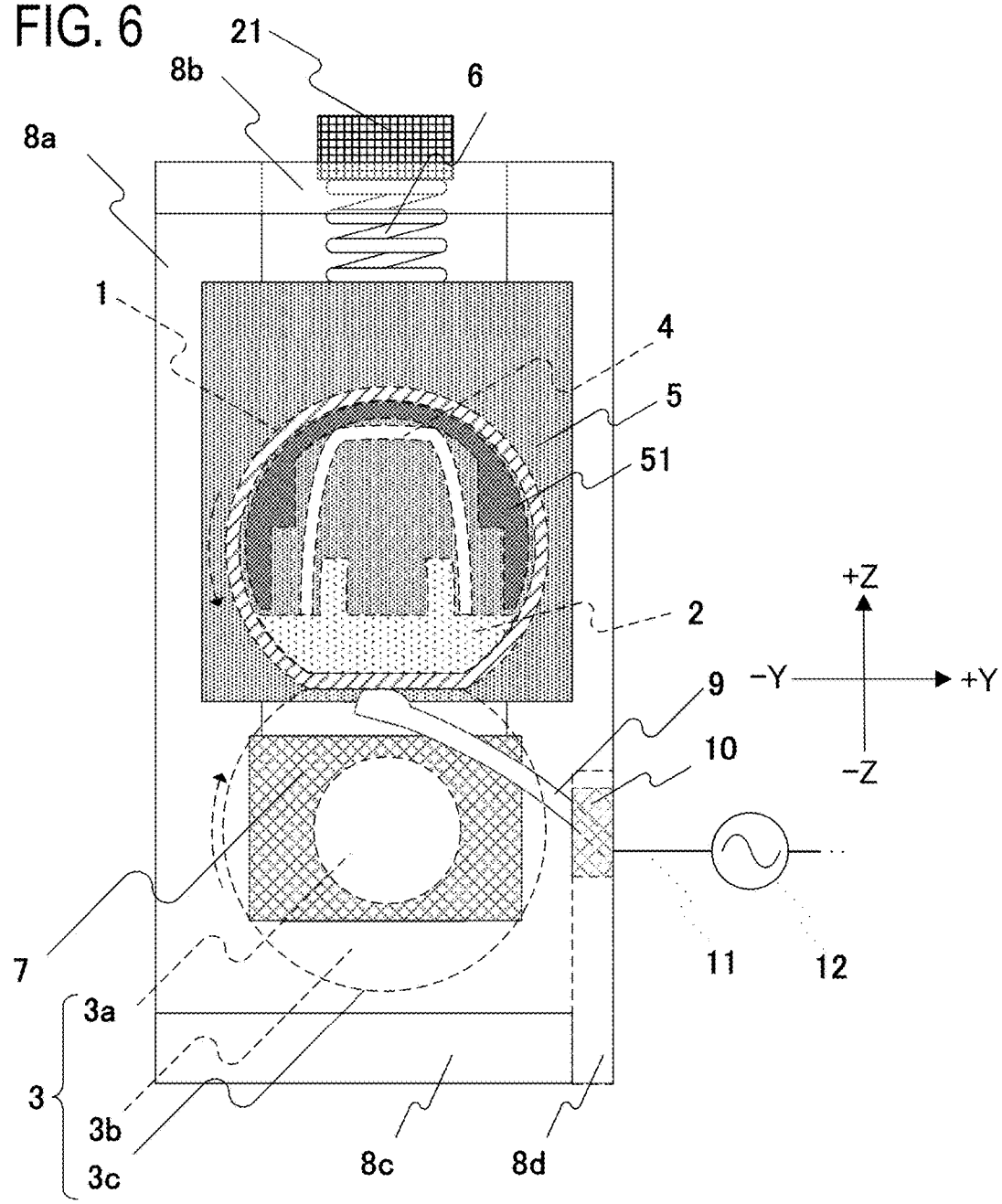

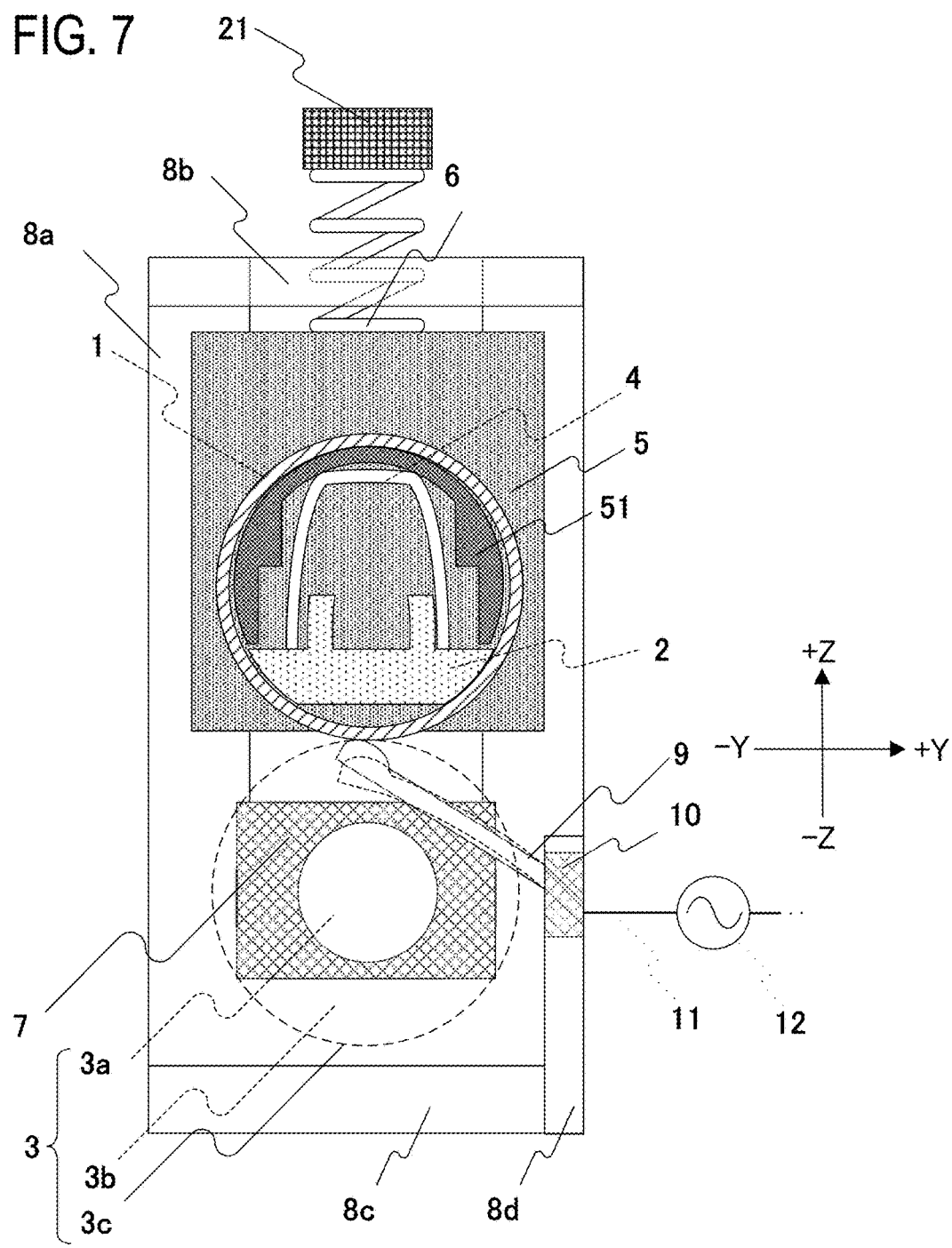

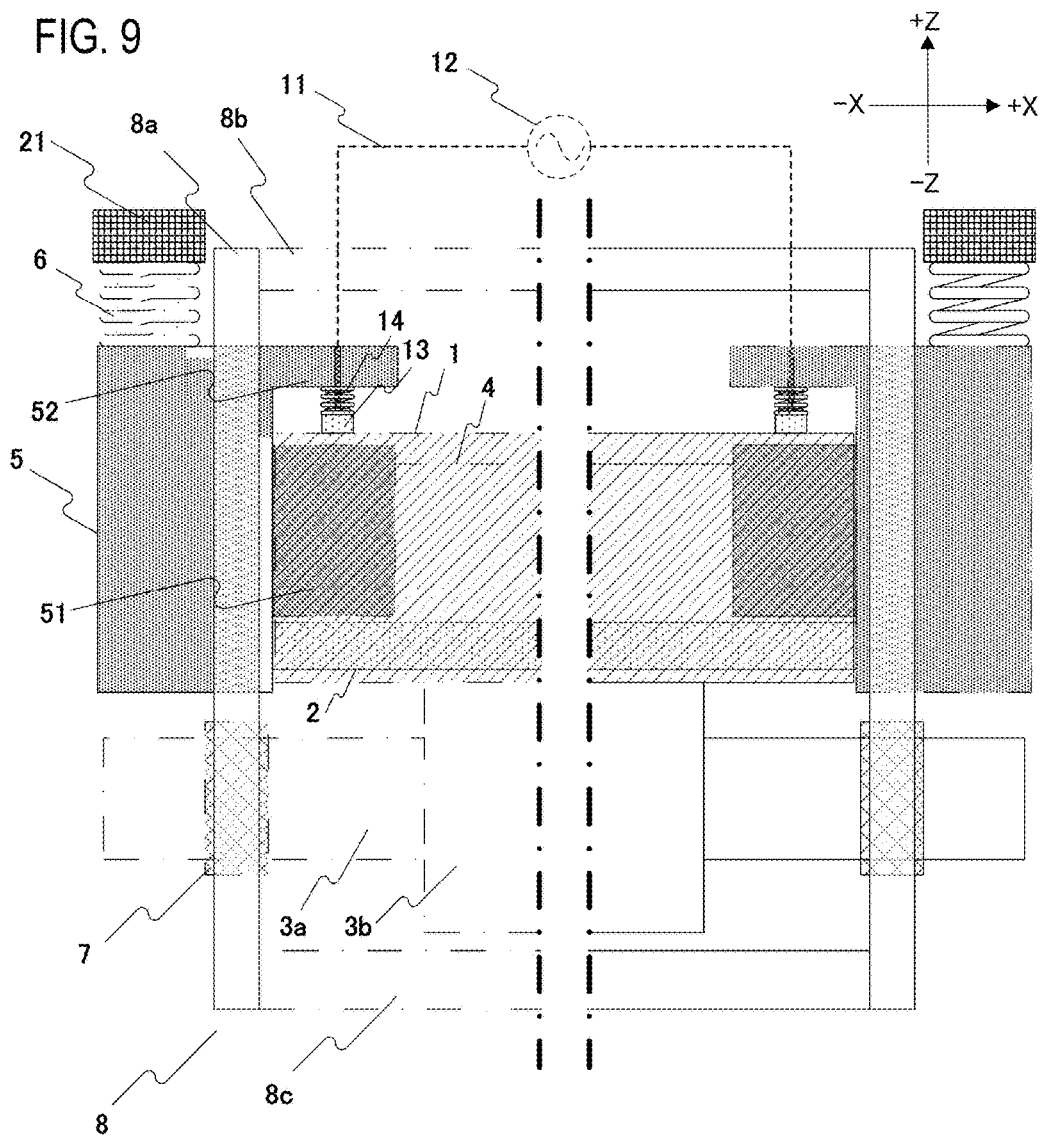

as fixing apparatuses for image forming apparatuses, such
FIXING APPARATUS AND IMAGE FORMING APPARATUS THAT MAINTAIN A PRESSING FORCE BETWEEN A CONTACT MEMBER AND A HEAT ROTATING MEMBER This application claims the benefit of Japanese Patent Application No. 2017-123168, filed Jun. 23, 2017, which is hereby incorporated by reference herein in its entirety.

BACKGROUND OF THE INVENTION

Field of the Invention

The present invention relates to a fixing apparatus mounted to an image forming apparatus adopting an electrophotographic system, such as a copier and a printer.

Description of the Related Art

Examples of fixing apparatuses of image forming apparatuses, such as a printer and a copier, include a fixing apparatus that realizes high-speed start-up and energy saving by feeding power to a film including a heat generation layer, and to a rotating member, such as a roller, and by performing Joule heating.

In addition, a system that enables a further reduction in start-up time by suppressing thermal conduction to members other than an exothermic body when starting up a fixing apparatus is proposed. For example, in Japanese Patent Application Laid-open No. 2013-29728, by varying a degree of pressurization exerted on a fixing film and a pressure roller, power is fed to the fixing film in a state in which the fixing film and the pressure roller are separated from each other or a state in which a contact area between the fixing film and the pressure roller has decreased, whereby a ramp rate of an exothermic body is increased.

SUMMARY OF THE INVENTION

In the conventional example described above, however, a change in a relative position of the fixing film due to a change in the degree of pressurization may cause a power-fed portion to separate from a contact member and to reduce a pressing force of the contact member with respect to the power-fed portion. A reduction in the pressing force of the contact member results in a reduction in the area of a real contact surface between a contacted member and the contact member. In this case, a real contact surface refers to an interface that is narrower than an apparent contact surface and that actually functions as a conduction path. Furthermore, a reduction in the area of the real contact surface causes contact resistance between the contacted member and the contact member to increase and creates power loss at a contact portion. In other words, due to the reduction in the pressing force of the contact member with respect to the contacted member, power loss is created and an effect of a standby time reduction due to a separated start-up is diminished. In addition, the power loss at the contact portion may cause the temperature of a part of the contacted member to unintentionally rise, thereby reducing durability of the contacted member.

An object of the present invention, therefore, is to provide a fixing apparatus capable of preventing a reduction in a pressing force exerted on a contacted member by a contact member by a separating operation of a fixing film and a pressure roller, capable of preventing a power loss at a contact portion, and having a high durability.

In order to achieve the object described above, a fixing apparatus according to the present invention includes a heating rotating member that generates heat when energized, a pressure rotating member that forms a nip portion, together with the heating rotating member, in which a developer image, formed on a recording medium, is fixed to the recording medium while the recording medium is transported through the nip portion, a contact member that comes into contact with and feeds power to the heating rotating member, a contact holding member that holds the contact member and that presses the contact member against the heating rotating member by causing at least a part of the contact member to elastically deform between the heating rotating member and the contact holding member, and a displacement mechanism that displaces a relative position of the heating rotating member with respect to the pressure rotating member, wherein, when the heating rotating member is separated from the pressure rotating member by the displacement mechanism, an interval between a fulcrum, at which the contact holding member holds the contact member, and a contact point, at which the contact member comes into contact with the heating rotating member, does not increase.

As described above, according to the present invention, a reduction in a pressing force exerted on a contacted member by a contact member during separation of a fixing film and a pressure roller can be suppressed, a power loss at a contact portion due to a reduction in the pressing force can be prevented, and a reduction in durability of the fixing film can be prevented.

Further features of the present invention will become apparent from the following description of exemplary embodiments with reference to the attached drawings.

BRIEF DESCRIPTION OF THE DRAWINGS

FIG. 1 is a cross-sectional schematic view of a vicinity of a longitudinal center portion of a fixing apparatus, FIG. 2 is a front schematic view of a fixing apparatus according to a first embodiment, FIG. 3 is a cross-sectional schematic view of a vicinity of a longitudinal end portion in a pressure contact state according to the first embodiment, FIG. 4 is a cross-sectional schematic view of a vicinity of a longitudinal end portion in a separation state according to the first embodiment, FIG. 6 is a cross-sectional schematic view of a vicinity of a longitudinal end portion in a pressure contact state according to a comparative example of the first embodiment, FIG. 7 is a cross-sectional schematic view of a vicinity of a longitudinal end portion in a separation state according to a comparative example of the first embodiment, FIG. 9 is a front schematic view of a fixing apparatus according to a second embodiment.

DESCRIPTION OF THE EMBODIMENTS

Hereafter, a description will be given, with reference to the drawings, of embodiments (examples) of the present invention. The sizes, materials, shapes, their relative arrangements, or the like of constituents described in the embodiments may, however, be appropriately changed according to the configurations, various conditions, or the like, of apparatuses to which the invention is applied. Therefore, the sizes, materials, shapes, their relative arrangements, or the like, of the constituents described in the embodiments do not intend to limit the scope of the invention to the following embodiments.

First Embodiment

Overall Configuration of Image Forming Apparatus

Figure 20:
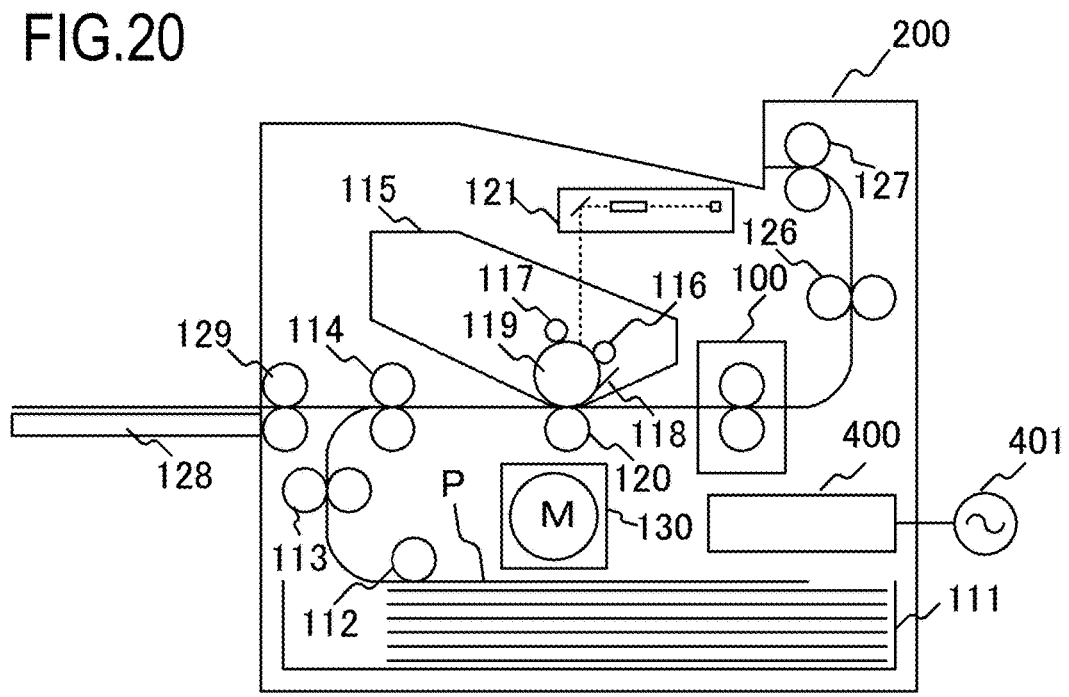
FIG. 20 is a schematic cross-sectional view of an image forming apparatus provided with a fixing apparatus.

First, an outline of an image forming apparatus provided with a fixing apparatus described in detail below will be given with reference to FIG. 20.

An image forming apparatus 200 according to the present embodiment is a laser printer that forms an image on a recording material using an electrophotographic system.

When a print signal is generated, a scanner unit 121 emits laser light modulated in accordance with image information to scan a surface of a photosensitive drum 119 charged to a prescribed polarity by a charging roller 116. Accordingly, an electrostatic latent image is formed on the photosensitive drum 119. When the electrostatic latent image formed on the photosensitive drum 119 is supplied with toner charged to a prescribed polarity from a developing roller 117, the electrostatic latent image is developed as a toner image (a developer image). Meanwhile, a recording material (a recording medium) P, stacked in a paper feeding cassette 111, is fed one by one by a pickup roller 112, and is transported toward a resist roller pair 114 by a transporting roller pair 113. Furthermore, the recording material P is transported from the resist roller pair 114 to a transfer position formed by the photosensitive drum 119 and a transfer roller 120 in synchronization with the arrival of the toner image on the photosensitive drum 119 at the transfer position. The toner image on the photosensitive drum 119 is transferred to the recording material P as the recording material P passes the transfer position. Subsequently, the recording material P is heated and pressurized by a fixing apparatus 100 and the toner image is fixed by heat to the recording material P. The recording material P bearing the fixed toner image is discharged to a paper discharge tray 131 in an upper portion of the image forming apparatus 200 by a pair of transporting rollers 126 and 127. Specifically, the fixing apparatus 100 has the detailed configuration that is described in the present embodiment and described later in second to fourth embodiments.

Residual toner, and the like, on the surface of the photosensitive drum 119 is removed and cleaned by a cleaner 118. A paper feeding tray (a manual feeding tray) 128 has a pair of recording paper restricting plates having a width that is adjustable in accordance with a size of the recording material P, and that is provided in order to accommodate recording materials P with sizes other than regular sizes. A pickup roller 129 is a roller for feeding the recording material P from the paper feeding tray 128. A motor 130 drives the fixing apparatus 100, and the like. Power is supplied to the fixing apparatus 100 from a control circuit 400 as an energization control portion connected to a commercial AC power supply 401.

The photosensitive drum 119, the charging roller 116, the scanner unit 121, the developing roller 117, and the transfer roller 120 described above constitute an image forming portion that forms an unfixed image on the recording material P. In addition, in the present embodiment, a developing unit including the photosensitive drum 119, the charging roller 116, and the developing roller 117, and a cleaning unit including the cleaner 118 are configured as a process cartridge 115 that is attachable to, and detachable from, an apparatus main body of the image forming apparatus 200.

Description of Fixing Apparatus

A configuration of a fixing apparatus 100 according to the first embodiment will now be described with reference to FIGS. 1 to 3. As shown in the diagrams, an "X direction" as used herein refers to a longitudinal direction of the fixing apparatus 100, and is a direction of a rotational axis of a pressure roller (to be described later), which is perpendicular to a transport direction of the paper (i.e., the recording material P). A "Y direction" refers to a direction in which a recording material P passing through the fixing apparatus 100 is transported. A "Z direction" refers to a height direction of the fixing apparatus 100, which is perpendicular to the X and Y directions.

FIG. 1 is a cross-sectional schematic view of a vicinity of a longitudinal center portion of the fixing apparatus 100. FIG. 2 is a front schematic view of the fixing apparatus 100. In FIG. 2, a vicinity of a longitudinal end portion is depicted in detail and a longitudinal center portion is omitted. FIG. 3 is a cross-sectional schematic view of a vicinity of a longitudinal end portion of the fixing apparatus 100 (viewing in the arrow A direction in FIG. 2).

When a recording material P, bearing a toner image T, is heated while being transported in a fixing nip portion N from a left side in FIG. 1, the toner image T is fixed to the recording material P.

The fixing apparatus 100 according to the present embodiment is constituted by a cylindrical film 1, a nip forming member 2 that holds the film 1, and a pressure roller 3 that forms a nip portion together with the film 1. In addition, the film 1 and the pressure roller 3 are kept in an approximately parallel state by an apparatus frame 8 made up of a side plate 8a, a top plate 8b, and a bottom plate 8c.

Reference numeral 1 denotes a fixing film as a heating rotating member. The film 1 has a heat generation layer (not shown) that generates heat when energized. In the present embodiment, polyimide with a thickness of approximately 60 μm and dispersed with carbon black is used as the heat generation layer. An elastic layer made of silicone rubber with a thickness of approximately 200 μm and a releasing layer made of perfluoroalkoxy alkane (PFA) with a thickness of approximately 15 μm are used as the heat generation layer. Resistance between both end portions of the film 1 according to the present embodiment was approximately 20Ω.

The nip forming member 2 is responsible for guiding the film 1 from an inner side and forming the nip portion N with the pressure roller 3 via the film 1. The nip forming member 2 is a member having rigidity, heat resistance, and heat insulating properties, and is formed by a liquid crystal polymer, or the like. The film 1 is fitted to the outside of the nip forming member 2.

Reference numeral 3 denotes a pressure roller as a pressure rotating member. The pressure roller 3 is constituted by a metal core 3a, an elastic layer 3b, and a releasing layer 3c. In the present embodiment, a pressure roller is used in which a silicone rubber layer with a thickness of approximately 3.5 mm is formed as the elastic layer 3b on the metal core 3a made of iron and having a diameter of approximately 5.5 mm, and the silicone rubber layer is coated by an insulating PFA tube with a thickness of approximately 30 μm as the releasing layer 3c. As shown in FIG. 2, both ends of the pressure roller 3 are rotatably held by the side plate 8a via a bearing member 7. In addition, the pressure roller 3 is rotationally driven by a drive gear (not shown), and the film 1 rotates so as to follow the rotation of the pressure roller 3.

Reference numeral 9 denotes a leaf spring member as a contact member for feeding power to the film 1. The leaf spring 9 is conductive and has elasticity. The leaf spring 9 is pressed against the film 1 from an outer circumferential side and comes into sliding contact with the film 1 when the film 1 rotates.

The leaf spring 9 is held via an insulating member 10 in a hole provided on the top plate 8b. The insulating member 10 doubles as an insulating member that insulates the top plate 8b from the leaf spring 9 and a contact holding member that holds the leaf spring 9 that is a contact member. A deflection (an elastic deformation) is created in the leaf spring 9 as the leaf spring 9 comes into contact with the film 1, and the deflection generates internal stress inside the leaf spring 9 and presses the leaf spring 9 against the film 1 with a certain pressing force. A leaf spring made of stainless steel is used as the leaf spring 9 in the present embodiment. The top plate 8b and the side plate 8a, and the side plate 8a and the bottom plate 8c constituting the apparatus frame 8 are respectively bonded to each other, and a positional relationship between the pressure roller 3 that is held by the side plate 8a via the bearing member 7 and a fulcrum at which the leaf spring 9 is held by the top plate 8b via the insulating member 10 always remains the same.

An end portion of the leaf spring 9 fixed to the top plate 8b is connected to a lead wire 11 and is further connected to a power supply 12 as an AC power supply that supplies power to the film 1. As shown in FIG. 2, a current generated by the power supply 12 is sent to the film 1 via left and right lead wires 11 and the leaf spring 9, and the film 1 is resistance-heated by the current. Total contact resistance of both sides between the film 1 and the leaf spring 9 as a contact member in a pressure contact state was 0.30Ω, which is sufficiently smaller than the resistance of the heat generation layer of the film 1.

Reference numeral 5 denotes a flange that holds the film 1 at both ends. While movement in the longitudinal direction of the flange 5 is restricted by the side plate 8a, the flange 5 has freedom of movement in the Z-axis direction. As shown in FIG. 2, both end portions of the film 1 are fitted to the outside of a film supporting portion 51, as a protruded portion of the flange 5, to restrict movement of the film 1 in the longitudinal direction. The flange 5 is pressed with a prescribed pressing force by a biasing spring 6, which is a compression spring, and the pressing force is sequentially transmitted from the film supporting portion 51 of the flange 5 to a reinforcing stay 4, the nip forming member 2, and the film 1. Accordingly, the pressure roller 3 is pressed against the film 1, and the nip portion N with a prescribed width W is formed between the film 1 and the pressure roller 3. The reinforcing stay 4 is responsible for transmitting the pressing force received from the flange 5 to the nip forming member 2 in a uniform manner in a nip longitudinal direction. In the present embodiment, a ZINKOTE steel sheet with rigidity is used.

Description of Separating Operation of Fixing Apparatus

The fixing apparatus according to the present embodiment performs a pressure contact/separation operation that changes a pressed state of the film 1 and the pressure roller 3 by changing a pressed state of the biasing spring 6. The pressure contact/separation operation of the present fixing apparatus will be described with reference to FIG. 3, showing a fixing apparatus 100 in a pressure contact state, in which the film 1 and the pressure roller 3 are pressed, and FIG. 4, showing a situation in which the fixing apparatus 100 in the pressure contact state in FIG. 3 has changed to a separation state.

The present fixing apparatus 100 includes pressurization degree control means 21, which is a displacement mechanism that displaces a relative position of the film 1, as a heating rotating member, with respect to the pressure roller 3, as a pressure rotating member, by changing a position of the film 1. An amount of deflection of the biasing spring 6 is changed by the pressurization degree control means 21 and a pressing force exerted on the flange 5 changes. Accordingly, the flange 5 moves in a +Z direction in FIG. 3 and, in conjunction therewith, the film 1 moves. On the other hand, the position of the pressure roller 3, which is fixed to the side plate 8a via the bearing member 7, does not change. In other words, in the fixing apparatus 100 according to the present embodiment, the pressurization degree control means 21 changes relative positions of the film 1 and the pressure roller 3 and enables a pressure contact operation (FIG. 3), which places the film 1 and the pressure roller 3 in a pressure contact state, and a separating operation (FIG. 4), which places the film 1 and the pressure roller 3 in a separation state, to be performed. The "separation state" as used herein refers to a state in which a contact area between the film 1 and the pressure roller 3 has decreased from a pressure contact state or a state in which the film 1 and the pressure roller 3 have become completely separated from each other due to a reduction in the pressing force between the film 1 and the pressure roller 3. In the present embodiment, the pressure roller 3 is pressed against the film 1 with a force of approximately eighteen kgf in the pressure contact state, and the pressing force of the biasing spring 6 becomes approximately zero in the separation state. Even when the pressing force of the biasing spring 6 is brought close to zero due to the separating operation, self-weights of the film 1, the flange 5, the reinforcing stay 4, the nip forming member 2, and the like, are received by the pressure roller 3. Therefore, the nip N is formed even in the separation state, and a nip width W thereof is approximately ⅕ of a nip width W in the pressure contact state. In addition, in the separation state, a contact area between the film 1 and the nip forming member 2 has decreased. From the arrangement described above, in the separation state, thermal conduction from the film 1 to the pressure roller 3 and the nip forming member 2 is suppressed. Therefore, a standby time of the fixing apparatus 100 can be reduced by feeding power in the separation state prior to heating an image. In addition, although the leaf spring 9 is arranged at a position in which separation of the film 1 is prevented, the pressing force of the leaf spring 9 is sufficiently smaller than the pressing force of the biasing spring 6 and a separating operation of the film 1 with respect to the pressure roller 3 can be performed by the pressurization degree control means 21.

In the present embodiment, the pressing force exerted by the leaf spring 9, as a contact member to the film 1, as a heating rotating member, is increased by a separating operation. Due to the separating operation, the flange 5 and the film 1 move in an interlocked manner in the +Z direction in which the leaf spring 9 is arranged. On the other hand, the leaf spring 9 is fixed to the top plate 8b, and the position of the fulcrum at which the leaf spring 9 is supported by the top plate 8b via the insulating member 10 is not changed by a separating operation in a similar manner to the pressure roller. Therefore, the separating operation changes a relative positional relationship between the film 1 and the leaf spring 9 and, due to a change in a posture of the leaf spring 9, the pressing force exerted on the film 1 increases. Details of the increase in the pressing force will be described later.

Effect of Present Embodiment

Figure 5A:
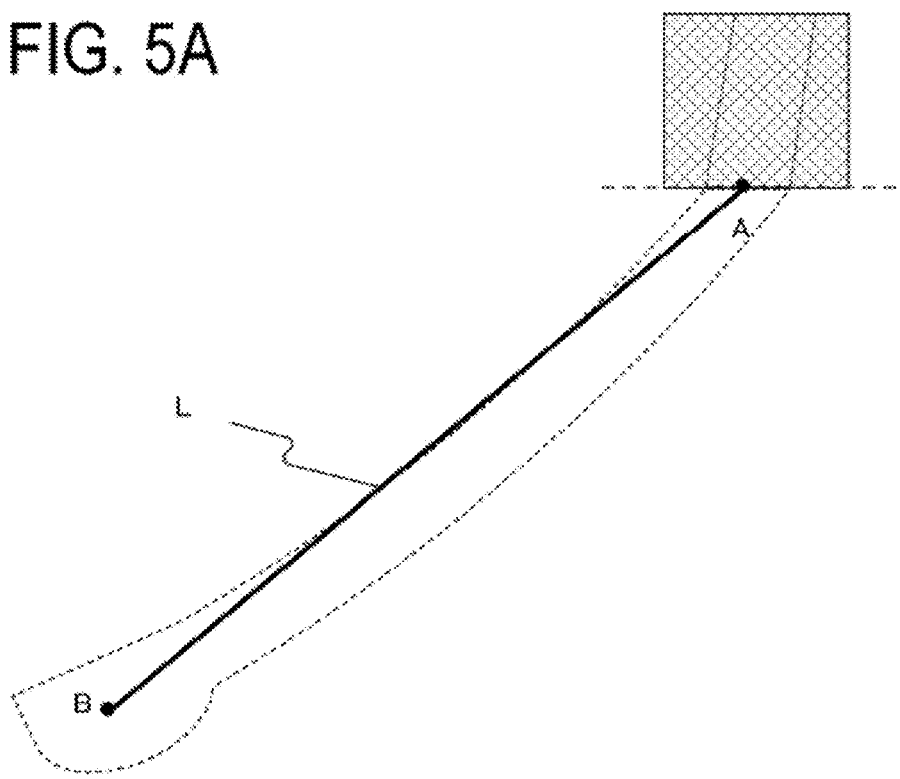
FIGS. 5A and 5B are diagrams illustrating a change in the shape of a leaf spring due to a pressure contact/separation operation according to the first embodiment.
Figure 5B:
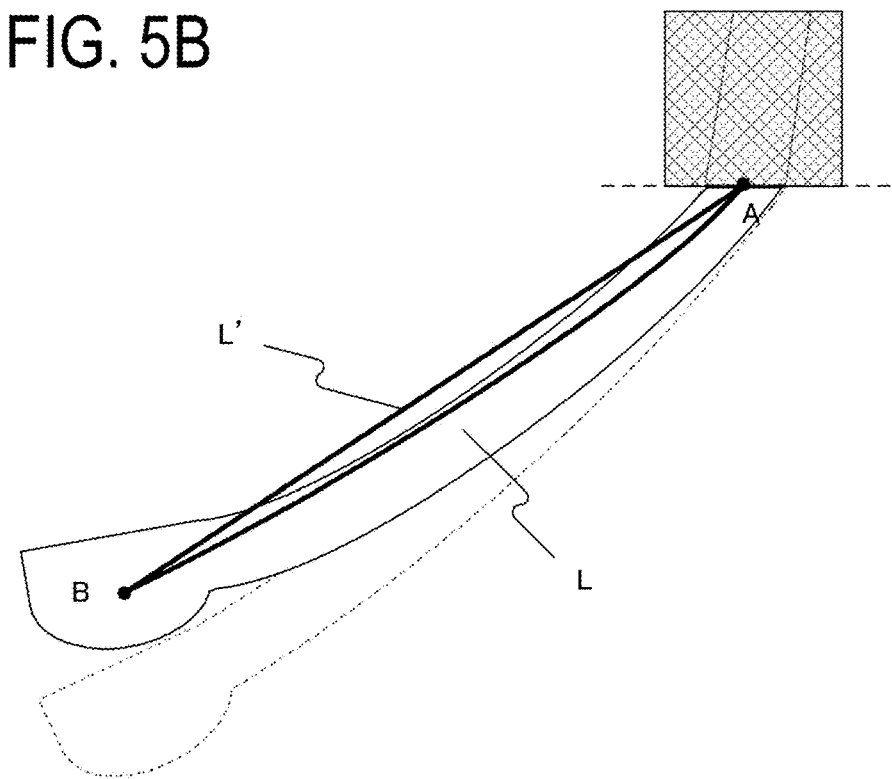

FIGS. 5A and 5B are diagrams representing a change in the shape of a leaf spring 9 in detail. FIG. 5A represents a posture of the leaf spring 9 during pressure contact, and FIG. 5B represents a posture of the leaf spring 9 during separation. Let us assume that a center of a location where the leaf spring 9, as a contact member, is fixed to the top plate 8b via the insulating member 10, as a contact holding member, is a fulcrum point A. In addition, let us assume that a center of the leaf spring at a contact location where the film 1, as a heating rotating member, and the leaf spring 9, as the contact member, are in contact with each other is a contact point B. In the present embodiment, an interval between the fulcrum point A at which the leaf spring 9, as a contact member, is supported by the insulating member 10, as a contact holding member, and the film 1, as a heating rotating member, and the leaf spring 9, is not increased by a separating operation. If L denotes a length between the fulcrum point A and the contact point B in the pressure contact state, and L' denotes a length between the fulcrum point A and the contact point B in the separation state, then L>L' is satisfied. L is a length representing a degree of curvature of the leaf spring 9, such that, the shorter the length L, the greater the curvature of the leaf spring 9 and the greater the amount of deflection. Furthermore, as the amount of deflection increases, internal stress of the leaf spring 9 increases and a pressing force generated at the contact point B increases. In the present embodiment, with the increase in the amount of deflection of the leaf spring 9, the pressing force with respect to the film 1 increases in the separation state as compared to the pressure contact state. In addition, total contact resistance of both sides between the leaf spring 9 and the film 1 was $0.28\Omega$, which represents a reduction from the pressure contact state.

The effect of the present invention will become more apparent by a comparison with a comparative example.

Description of Fixing Apparatus According to Comparative Example

A configuration of a fixing apparatus according to a comparative example will now be described with reference to FIG. 6. FIG. 6 shows a configuration of a vicinity of a longitudinal end portion of the fixing apparatus in a pressure contact state. In the comparative example, the apparatus frame 8 is provided with a sheet metal 8d on a downstream side of the nip portion in the transport direction. In addition, the leaf spring 9 is fixed to the sheet metal 8d via the insulating member 10, and comes into contact with the film 1 from a side of the pressure roller 3. Total contact resistance of both sides between the leaf spring 9 and the film 1 at this point was $0.30\Omega$. Other configurations are the same as those of the first embodiment.

Description of Separating Operation of Fixing Apparatus

FIG. 7 shows a configuration of a vicinity of a longitudinal end portion of the fixing apparatus in a separation state. Due to a separating operation, the flange 5 and the film 1 move in an interlocked manner in a +Z direction opposite to a −Z direction in which the leaf spring 9 is arranged and, consequently, the posture of the leaf spring 9 has changed. Other configurations are the same as those of the first embodiment.

Effect of Present Comparative Example

Figure 8A:
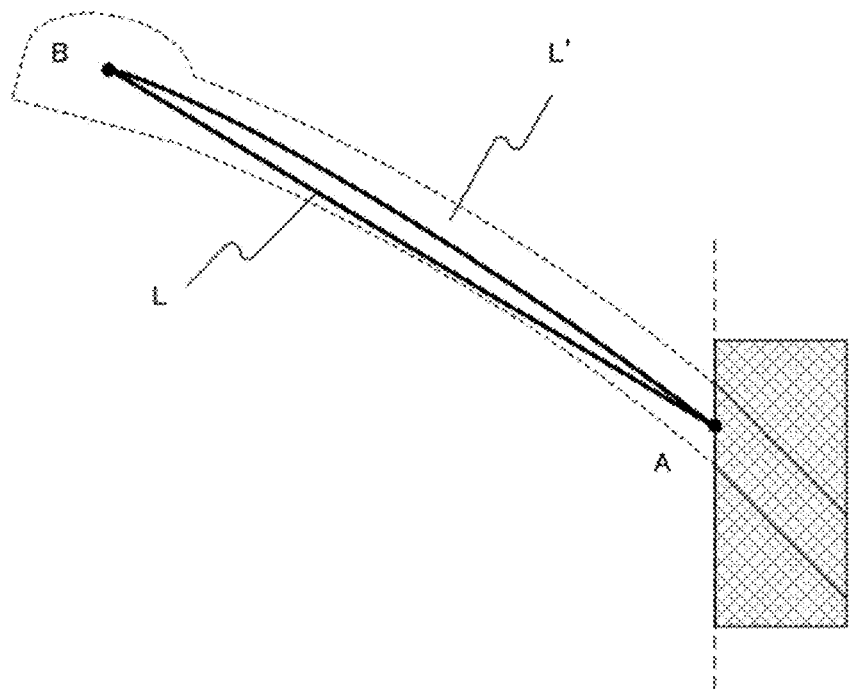
FIGS. 8A and 8B are diagrams illustrating a change in the shape of a leaf spring due to a pressure contact/separation operation according to the comparative example.
Figure 8B:
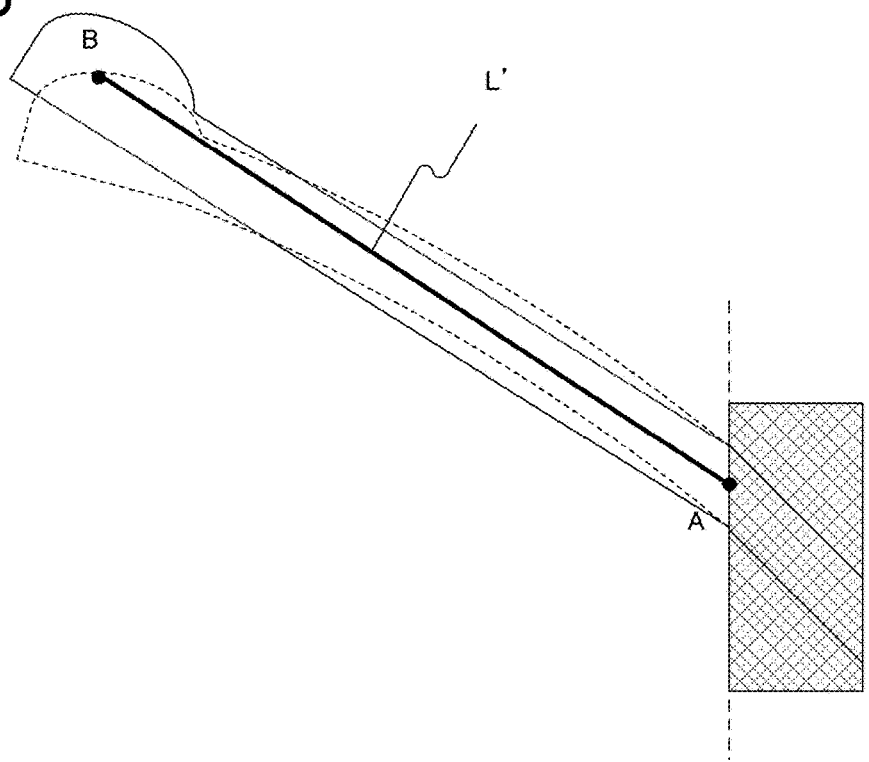

FIGS. 8A and 8B are diagrams representing a change in the shape of a leaf spring 9 in detail. FIG. 8A represents a posture of the leaf spring 9 during pressure contact, and FIG. 8B represents a posture of the leaf spring 9 during separation. A curvature of the leaf spring 9 is smaller during separation than during pressure contact and, from the diagrams, L<L' is satisfied. This indicates that an amount of deflection of the leaf spring 9 has been reduced in the separation state as compared to the pressure contact state. With the reduction in the amount of deflection, the pressing force with respect to the film 1 decreases in the separation state as compared to the pressure contact state. Total contact resistance of both sides between the leaf spring 9 and the film 1 at this point was approximately $2.0\Omega$, which represents an increase from the pressure contact state of the fixing apparatus. In addition, contact resistance values varied depending on a stop position of the film 1 and did not stabilize.

Comparison between First Embodiment and Comparative Example

As described above, it was confirmed that, in comparison to the configuration of the comparative example, the configuration of the first embodiment has an effect in that the pressing force of the leaf spring 9 as a contact member with respect to the film 1, as a heating rotating member, does not decrease and the contact resistance does not increase.

A similar operational effect to the first embodiment may be produced by a configuration in which a pressing force exerted by the contact member to the heating rotating member is not reduced by a separating operation. In addition, preventing the pressing force of the contact member from decreasing when the contact member is a leaf spring or a compression spring requires that an amount of deflection of the contact member does not decrease. For example, as in the first embodiment, the leaf spring 9, which is a contact member, need only be provided in a separation direction (the +Z direction in the drawings) of the film 1, which is a heating rotating member. Since adopting such an arrangement causes the leaf spring 9 to be arranged contrary to the separation of the film 1, the amount of deflection of the leaf spring 9 increases and prevents the pressing force from decreasing. In addition, as described with reference to FIGS. 5A and 5B, the pressing force of the leaf spring 9 does not change when L=L', but increases when L>L'. Therefore, L≥L' need only be satisfied. Furthermore, when the film 1 and the leaf spring 9 are separated by a separating operation and the amount of deflection of the leaf spring 9 decreases as in the comparative example, the operational effect of the first embodiment cannot be obtained.

In addition, in the pressure contact state in which the film 1 rotates and rubs against the leaf spring 9, the film 1 conceivably wears down. Therefore, from the perspective of durability, the pressing force of the leaf spring 9 is desirably set low. On the other hand, when the pressing force is excessively low, there is a concern that contact resistance may increase and power loss may occur. Therefore, the leaf spring 9 is desirably arranged so as to come into contact with the film 1 with an optimal pressing force in the pressure contact state. In addition, in the separation state of the fixing apparatus 100, since the film 1 does not rotate and the film 1 and the leaf spring 9 do not rub against each other, an increase in the pressing force is less likely to affect the durability of the film 1 as compared to the pressure contact state. Therefore, in the separation state, the leaf spring 9 desirably comes into contact with the film 1, which is a heating rotating member, with a pressing force that is equivalent to or greater than the pressing force in the pressure contact state.

Second Embodiment

Description of Fixing Apparatus

Figure 10:
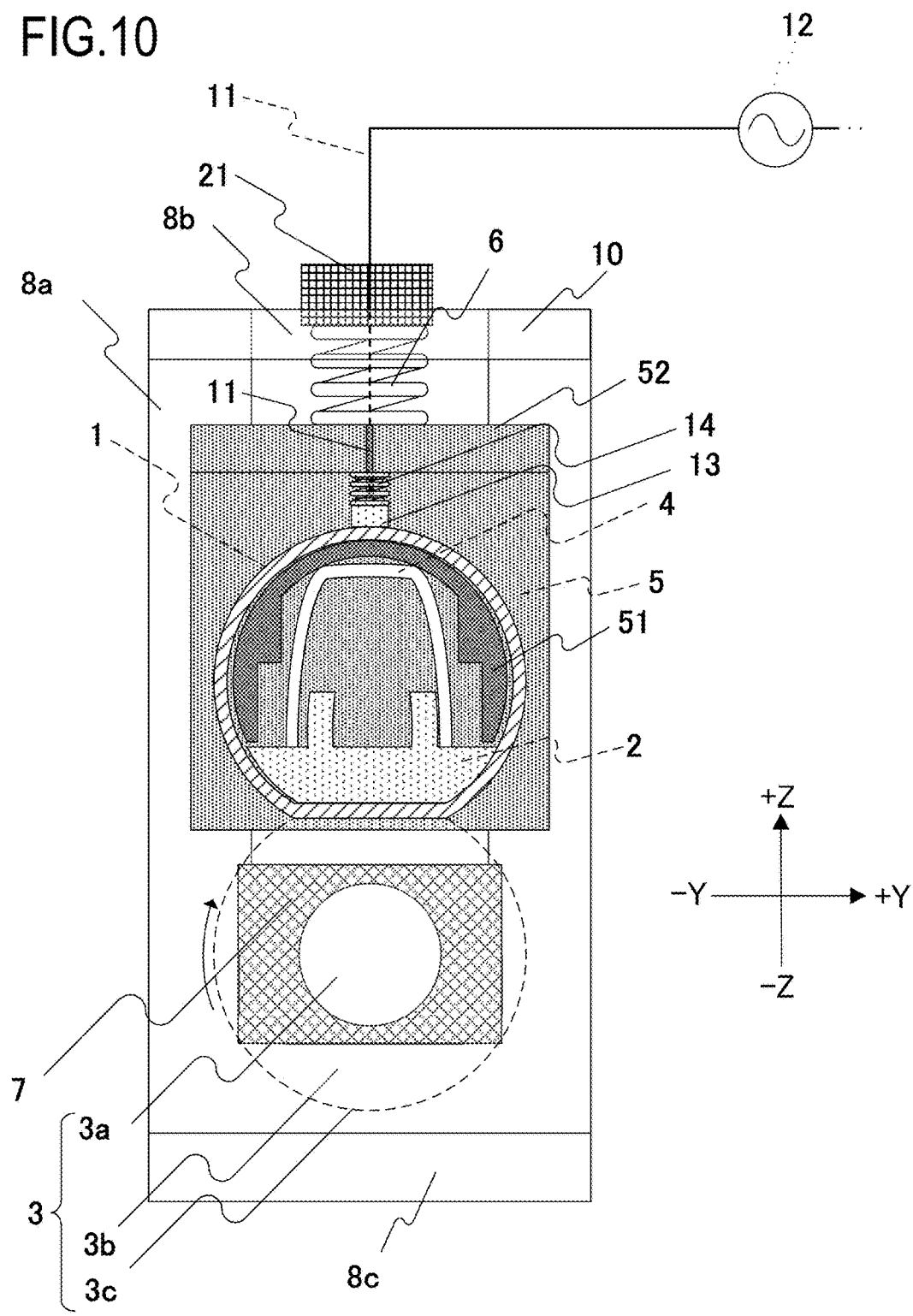
FIG. 10 is a cross-sectional schematic view of a vicinity of a longitudinal end portion in a pressure contact state according to the second embodiment.
Figure 11:
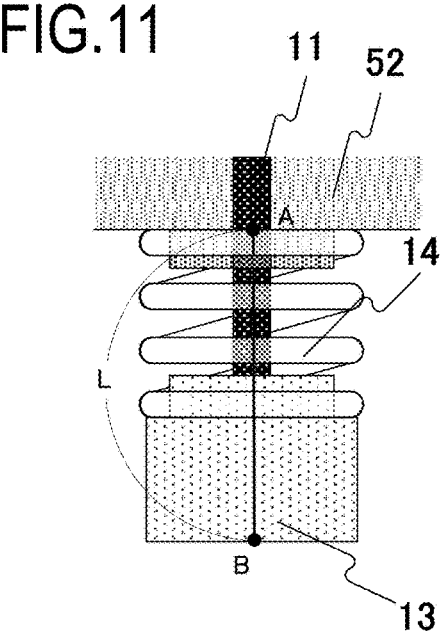
FIG. 11 is a diagram depicting in detail a state of a vicinity of a contact member according to the second embodiment.

A configuration of a fixing apparatus 100 according to a second embodiment will now be described with reference to FIGS. 9 to 11.

FIG. 9 is a front schematic view of the fixing apparatus 100. In FIG. 9, a vicinity of a longitudinal end portion is depicted in detail and a longitudinal center portion is omitted. FIG. 10 is a cross-sectional schematic view of a vicinity of a longitudinal end portion of the fixing apparatus 100. FIG. 11 is a schematic view depicting a vicinity of a contact member in detail.

In the present embodiment, an interval between a fulcrum point A at which a contact spring 14 and a block contact 13, as a contact member, is supported by the flange 5 as a contact holding member, and a contact point B at which the film 1, the contact spring 14, and the block contact 13 come into contact with each other, is not increased by a separating operation.

Reference numeral 13 denotes a block contact for feeding power to the film 1. Reference numeral 14 denotes an elastically deformable coil spring, which is a contact spring, for pressing the block contact 13 against the film 1. As shown in FIG. 11, the block contact 13 is shaped so as to include a cylindrical protruded portion in an upper portion of a prismatic base. The block contact 13 is held by the contact spring 14, as a lowermost portion of the contact spring 14 with a ring shape is fitted into the protruded portion 52 of the block contact 13. In addition, the contact spring 14 is held by the flange 5 as an uppermost portion of the contact spring 14 is fitted into a protruded portion of the flange 5.

A contact member is constituted by two or more members, and the block contact 13 and the contact spring 14 combine to function as the contact member. When the interval between the fulcrum point A at which the contact spring 14 and the protruded portion 52 of the flange 5 as a contact holding member come into contact with each other and a contact point B of the block contact 13 and the film 1 varies, the contact spring 14 elongates or contracts, and a pressing force exerted by the block contact 13 to the film 1 changes. In addition, the flange 5, as a contact holding member, also holds the film 1 as a heating rotating member. In the present embodiment, total contact resistance of both ends, at a contact surface of the block contact 13 and the film 1 in a pressure contact state of the fixing apparatus 100, was approximately 0.30Ω.

The lead wire 11 passes through a central space of the contact spring 14 that is a coil spring from the protruded portion of the block contact 13, passes through the inside of the flange 5, and is connected to the power supply 12. A current generated by the power supply 12 is sent to the film 1 via left and right lead wires 11 and the block contact 13. Other configurations are similar to those of the first embodiment.

Description of Separating Operation of Fixing Apparatus

Figure 12:
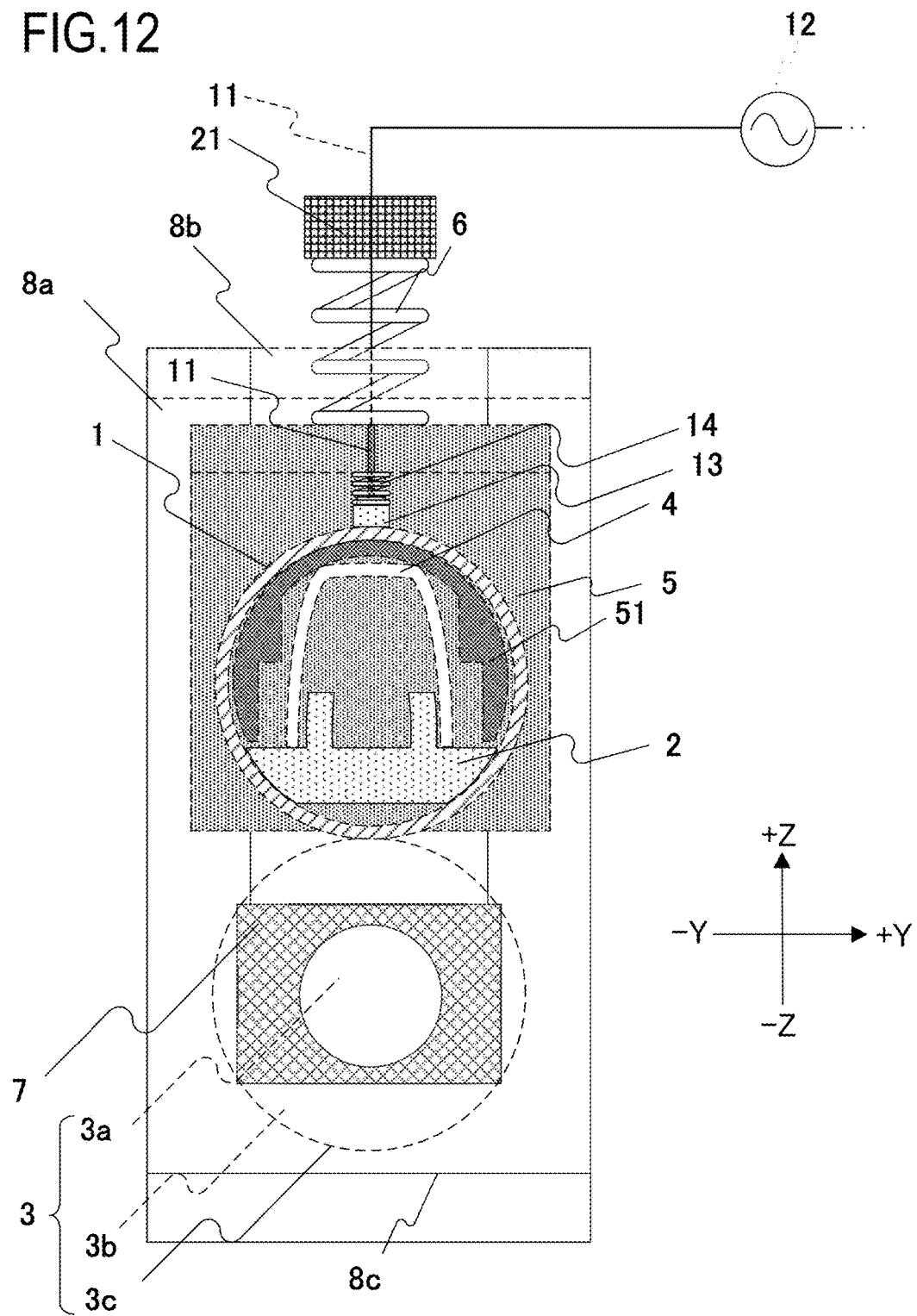
FIG. 12 is a cross-sectional schematic view of a vicinity of a longitudinal end portion in a separation state according to the second embodiment.

FIG. 12 shows a state of a cross-sectional schematic view at a vicinity of a longitudinal end portion when the fixing apparatus 100 is in a separation state.

In a similar manner to the first embodiment, the fixing apparatus 100 according to the present embodiment performs a pressure contact/separation operation by changing an amount by which the pressurization degree control means 21 changes an amount of deflection of the biasing spring 6. Due to the pressurization degree control means 21, as a displacement mechanism, the block contact 13 and the contact spring 14, and the film 1 move in an interlocked manner, and the block contact 13, the contact spring 14, the film 1, the flange 5, the nip forming member 2, and the reinforcing stay 4 are moved in an interlocked manner in the +Z direction by a separating operation.

In addition, a pressing force exerted by the contact spring 14 and the block contact 13 on the film 1 is not changed by a separating operation. While a position of the film 1 has been changed by a separating operation, it is shown that a relative positional relationship between the block contact 13 and the contact spring 14, and the film 1 has not changed. This is because the block contact 13 and the contact spring 14 are held by the flange 5 and, at the same time, the flange 5 holds the film 1, thereby causing the film 1, the flange 5, the contact spring 14, and the block contact 13 to move in an interlocked manner during the separating operation. As a result, a pressing force exerted by the contact spring 14 and the block contact 13 to the film 1 is not changed by a separating operation.

Effect of Present Embodiment

In the present embodiment, the film 1, the flange 5, the block contact 13, and the contact spring 14 are moved in an interlocked manner by a separating operation. Therefore, with respect a distance L between the fulcrum point A, at which a contact member and the flange 5, which is a contact holding member, come into contact with each other and the contact point B between the block contact 13 and the film 1, shown in FIG. 11, L=L' is satisfied even in a separation state of the fixing apparatus 100 in the same manner as in a pressure contact state. At this point, the total contact resistance of both ends at a contact surface of the block contact 13 and the film 1 in the separation state of the fixing apparatus was approximately 0.30Ω, which represents no change from the pressure contact state.

As described above, it was confirmed that, in a similar manner to the first embodiment, the configuration of the present embodiment has an operational effect in that the pressing force of the block contact 13 and the contact spring 14, as a contact member, with respect to the film 1, as a heating rotating member, does not decrease, and the contact resistance does not increase. In addition, in the present embodiment, since the pressing force can be prevented from increasing in the separation state, prevention of excessive stress being applied to the film 1 can be expected when placing the fixing apparatus 100 in long-term storage in a separation state. Therefore, from the perspective of durability, the present embodiment is superior to the first embodiment.

A similar operational effect to the present embodiment may be produced by a configuration in which a heating rotating member and a contact member are moved in an interlocked manner by a separating operation of the fixing apparatus 100.

In addition, when a contact holding member and a member that holds the heating rotating member are constituted by a same member, as in the case of the present embodiment, the contact member and the heating rotating member can be moved in an interlocked manner by a separating operation.

Modification of Second Embodiment

Description of Fixing Apparatus

Figure 13:
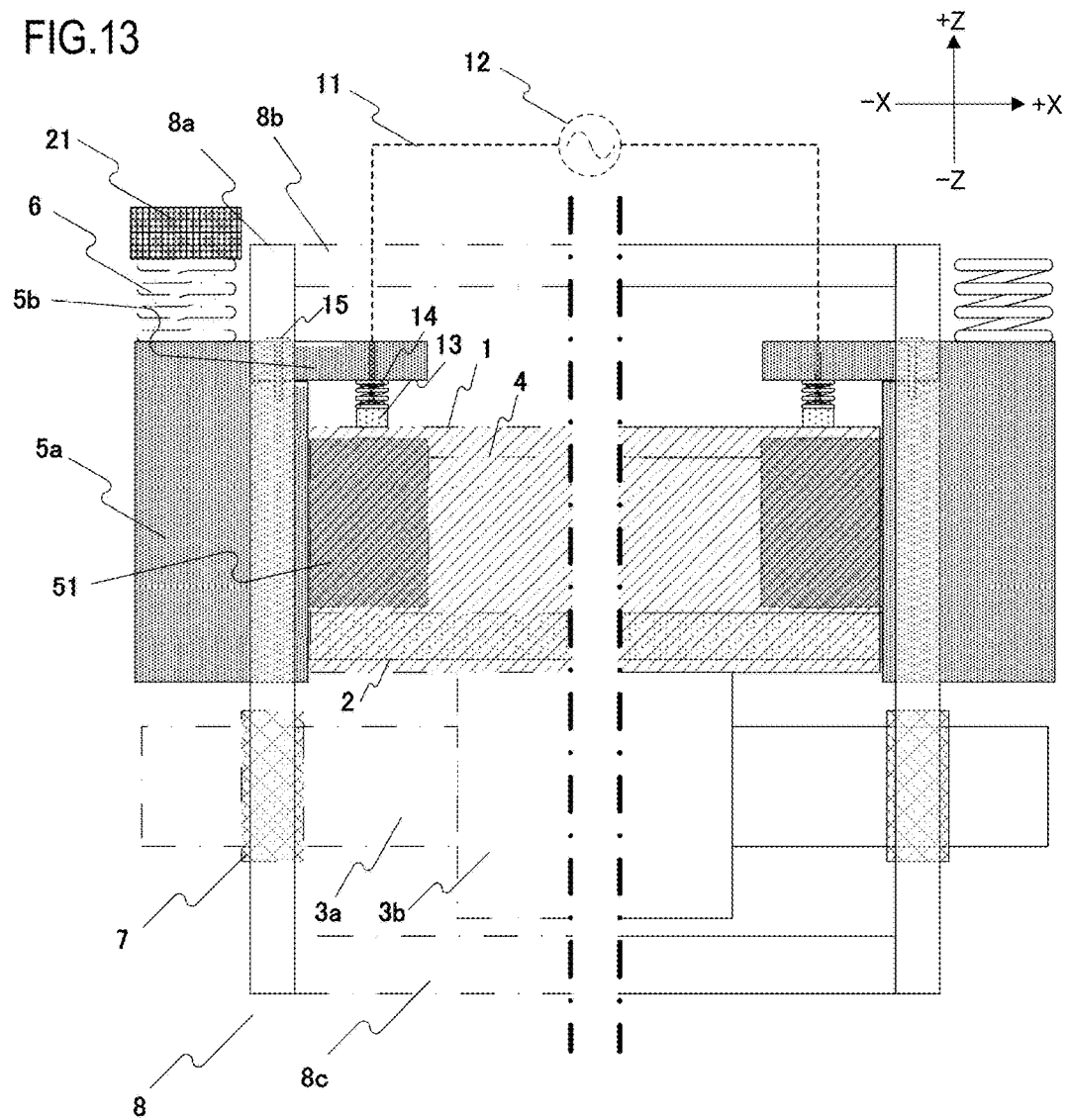
FIG. 13 is a front schematic view of a fixing apparatus according to a modification of the second embodiment.
Figure 14:
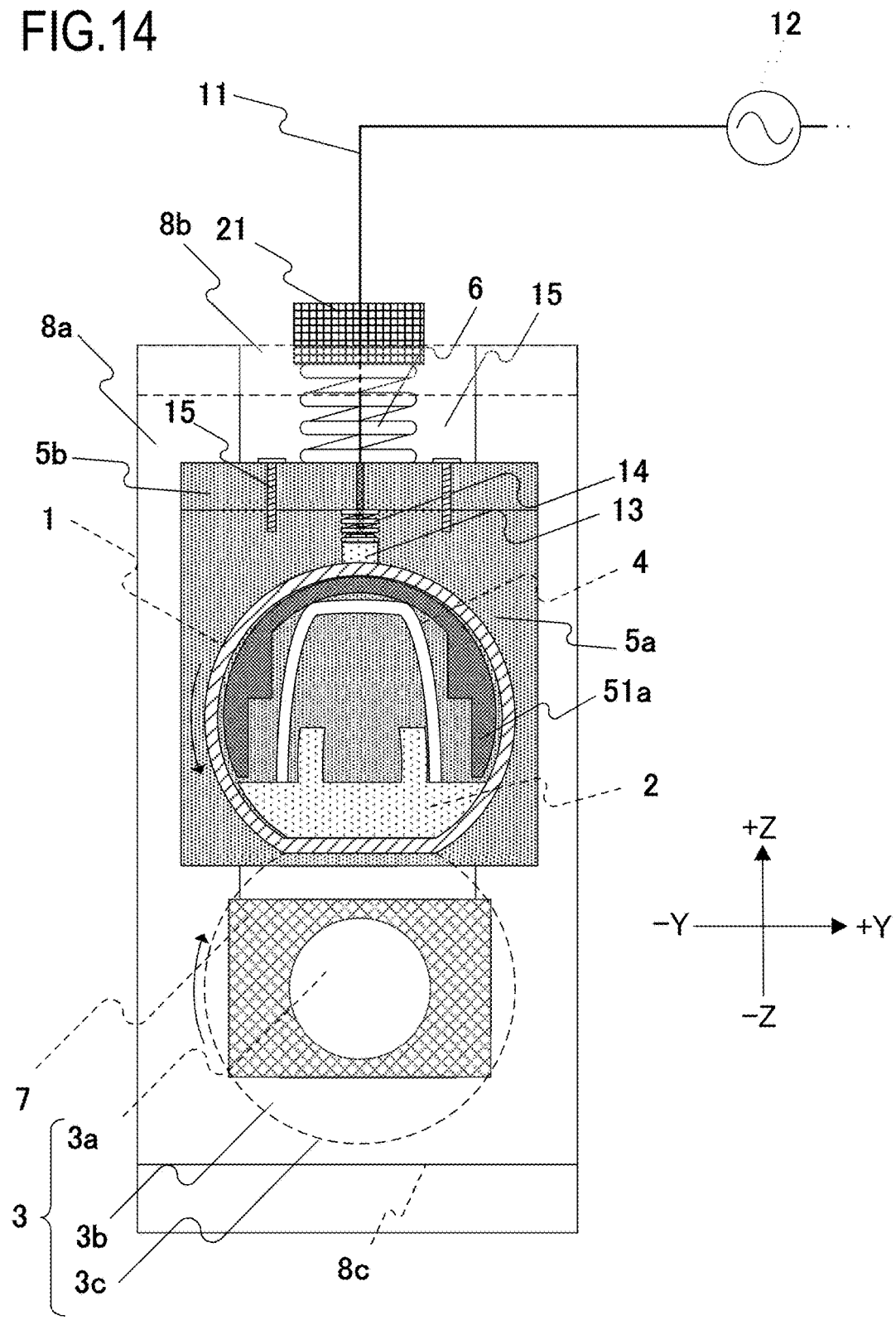
FIG. 14 is a cross-sectional schematic view of a vicinity of a longitudinal end portion in a pressure contact state according to a modification of the second embodiment.

A modification of the second embodiment will be described with reference to FIGS. 13 and 14. FIG. 13 is a front schematic view of the fixing apparatus 100. In FIG. 13, a vicinity of a longitudinal end portion is depicted in detail and a longitudinal center portion is omitted. FIG. 14 is a cross-sectional schematic view of a vicinity of a longitudinal end portion of the fixing apparatus 100. In the present modification, the flange 5 is divided into two members, namely, a flange 5a responsible for holding a film, and a flange 5b as a member that holds a contact member constituted by the block contact 13 and the contact spring 14. The flanges 5a and 5b are fixed by a fixing screw 15.

Other configurations are similar to those of the second embodiment.

Description of Separating Operation of Fixing Apparatus

During a separating operation, since the film 1, the flange 5a, the flange 5b, the contact spring 14, and the block contact 13 move in an interlocked manner, the relative positional relationship between the block contact 13 and the contact spring 14, and the film 1, does not change in a similar manner to the second embodiment.

Other operations are similar to those of the second embodiment.

Effect of Present Modification

A similar operational effect to the second embodiment is obtained.

While a case in which the flange 5, as a film holding member and a contact holding member, is divided into two members has been described in the present modification, as long as each member is fixed, a similar operational effect can be obtained regardless of how many members the flange 5 is divided into.

Third Embodiment

Description of Fixing Apparatus

A configuration of a fixing apparatus 100 according to a third embodiment will now be described with reference to FIGS. 15 to 17.

Figure 15:
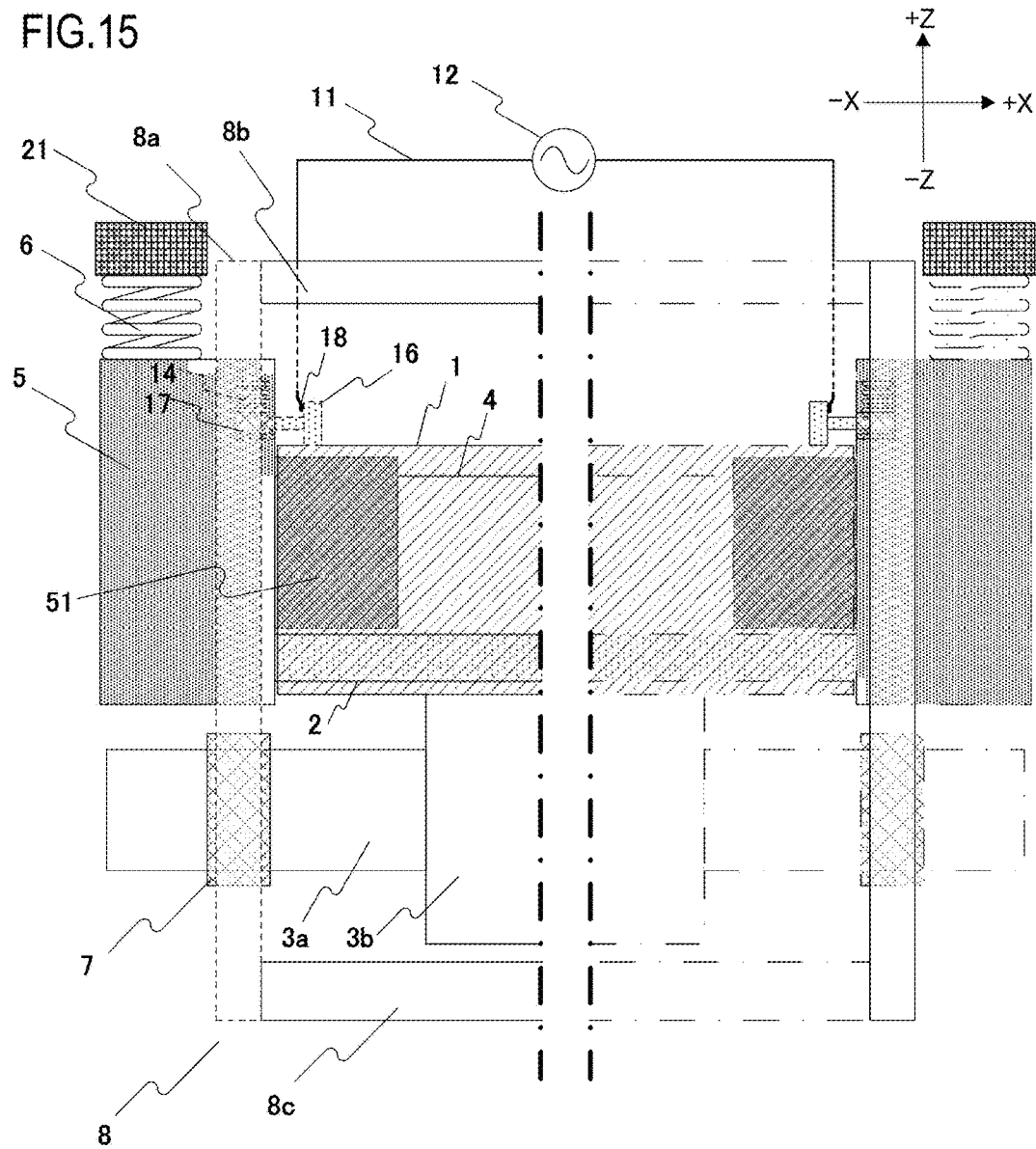
FIG. 15 is a front schematic view of a fixing apparatus according to a third embodiment.

FIG. 15 is a front schematic view of the fixing apparatus 100. In FIG. 15, a vicinity of a longitudinal end portion is depicted in detail and a longitudinal center portion is omitted. FIG. 16 is a cross-sectional schematic view of a vicinity of a longitudinal end portion of the fixing apparatus 100. FIG. 17 is a schematic view depicting a vicinity of a contact member in detail.

Reference numeral 16 denotes a rotating member for feeding power to the film 1. The rotating member 16 is rotatably held by the flange 5 via a rotating member bearing 17, and rotates so as to follow a rotation of the film 1. Reference numeral 14 denotes a contact spring for pressing the rotating member 16 against the film 1. The contact spring 14 presses the film 1 via the rotating member bearing 17 and the rotating member 16. The rotating member bearing 17 has a degree of freedom with respect to the Z-axis direction of the flange 5. Therefore, the rotating member bearing 17 can move up and down together with the rotating member 16 in accordance with an amount of deflection of the contact spring 14. In addition, a rotational axis of the rotating member 16 is parallel to a rotational axis of the film 1.

In the present embodiment, the rotating member 16, the rotating member bearing 17, and the contact spring 14 combine to function as a contact member that is held by the flange 5 as a contact holding member.

Figure 16:
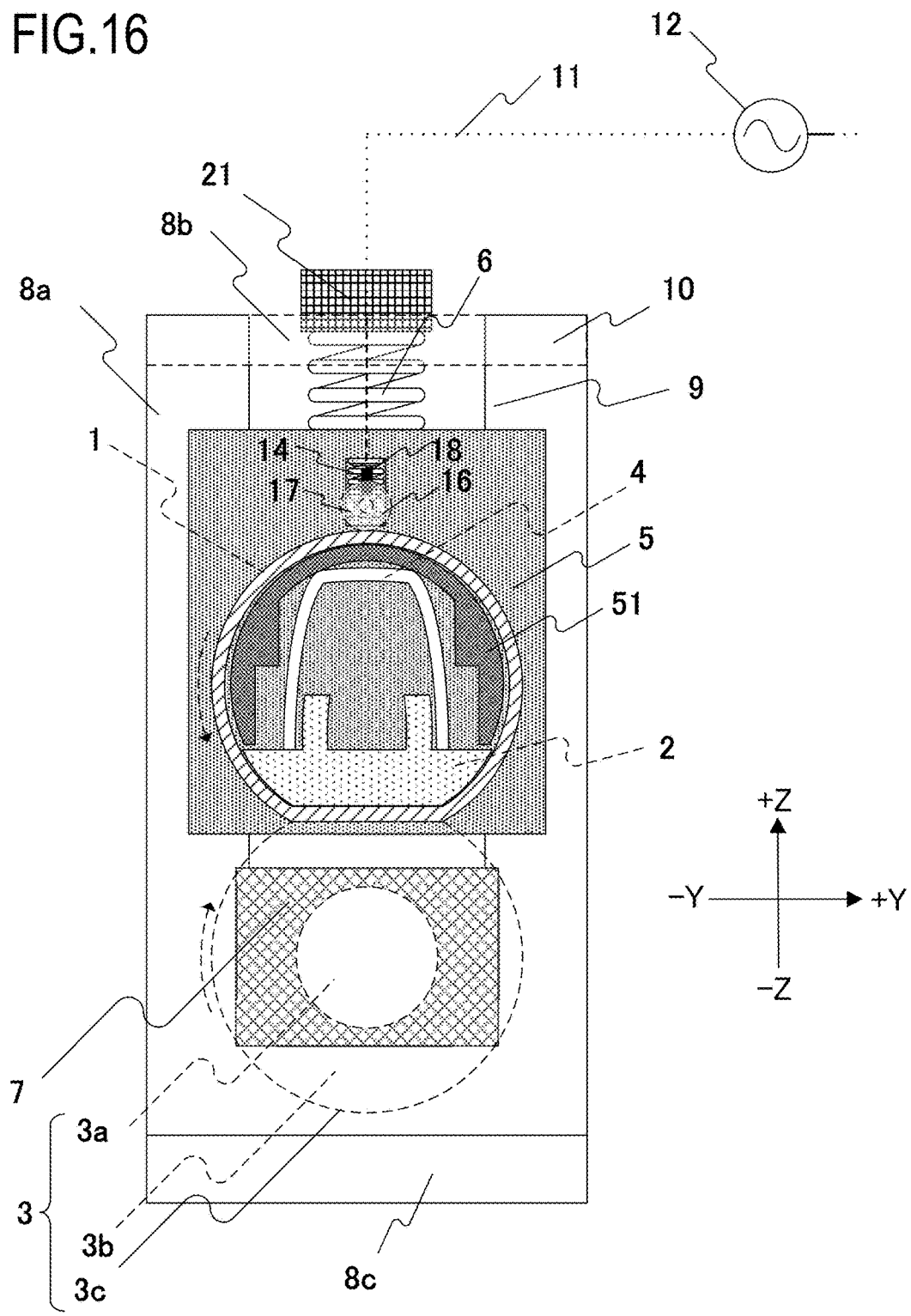
FIG. 16 is a cross-sectional schematic view of a vicinity of a longitudinal end portion in a pressure contact state according to the third embodiment.

Total contact resistance of both sides between the rotating member 16 and the film 1 in a pressure contact state of the fixing apparatus shown in FIGS. 15 and 16 was 0.30Ω.

Reference numeral 18 denotes a conductive power-feeding leaf spring which abuts the rotating member 16 with a prescribed pressing force. The power-feeding leaf spring 18 is connected to the power supply 12 by the lead wire 11. A current generated by the power supply 12 is supplied to the film 1 via the lead wire 11, the power-feeding leaf spring 18, and the rotating member 16.

Other configurations are similar to those of the first embodiment.

Description of Separating Operation of Fixing Apparatus

During a separating operation, since the film 1, the flange 5, the contact spring 14, the rotating member bearing 17, and the rotating member 16 move in an interlocked manner, a relative positional relationship between the rotating member 16, the rotating member bearing 17, and the contact spring 14, as a contact member, and the film 1, as a heating rotating member, does not change.

Other operations are similar to those of the second embodiment.

Effect of Present Embodiment

Figure 17:
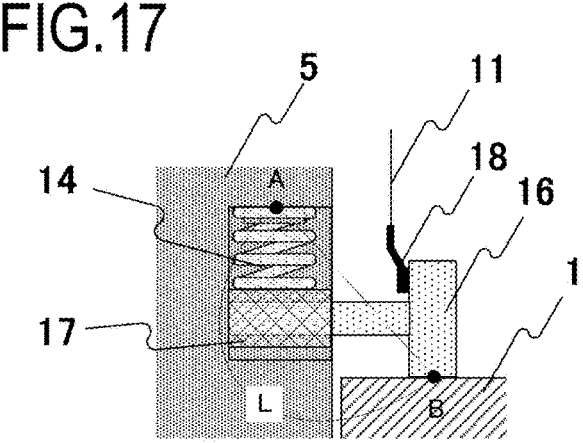
FIG. 17 is a diagram depicting in detail a state of a vicinity of a contact member according to the third embodiment.

With respect a distance L between the fulcrum point A, at which the contact spring 14 and the flange 5, which is a contact holding member, come into contact with each other and the contact point B between the rotating member 16 and the film 1, shown in FIG. 17, L=L' is satisfied even in a separation state of the fixing apparatus 100 in the same manner as in a pressure contact state. At this point, total contact resistance of both ends at a contact surface of the rotating member 16 and the film 1 in the separation state of the fixing apparatus 100 was approximately 0.30Ω, which represents no change from the pressure contact state.

As described above, it was confirmed that, in a similar manner to the first and second embodiments, the configuration of the present embodiment has an operational effect in that the pressing force of the rotating member 16, the rotating member bearing 17, and the contact spring 14, as a contact member, with respect to the film 1, as a heating rotating member, does not decrease and the contact resistance does not increase. In addition, in the present embodiment, since the rotating member 16 rotates so as to follow the film 1 (the rotating member 16 comes into rotational contact with the film 1), an effect of reducing wear due to rubbing between the film 1 and the contact member can be expected. Accordingly, an effect of suppressing both damage to the film 1 when placed in long-term storage in a separation state and wear of the film 1 in a pressure contact state can be expected. Therefore, the present embodiment is superior to other embodiments in terms of durability.

Fourth Embodiment

Description of Fixing Apparatus

A configuration of a fixing apparatus 100 according to the fourth embodiment will now be described with reference to FIGS. 18 and 19.

Figure 18:
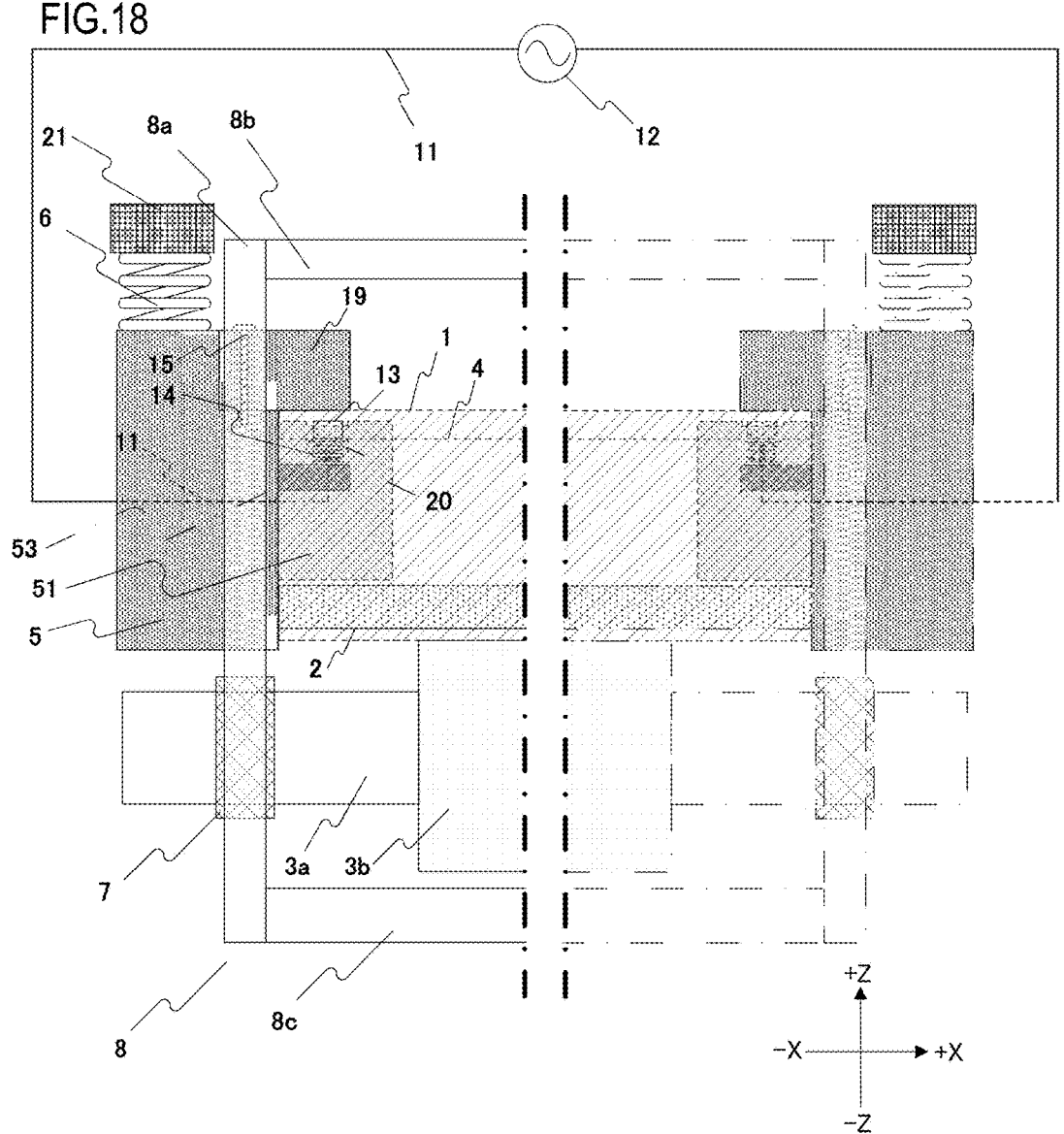
FIG. 18 is a front schematic view of a fixing apparatus according to a modification of a fourth embodiment.
Figure 19:
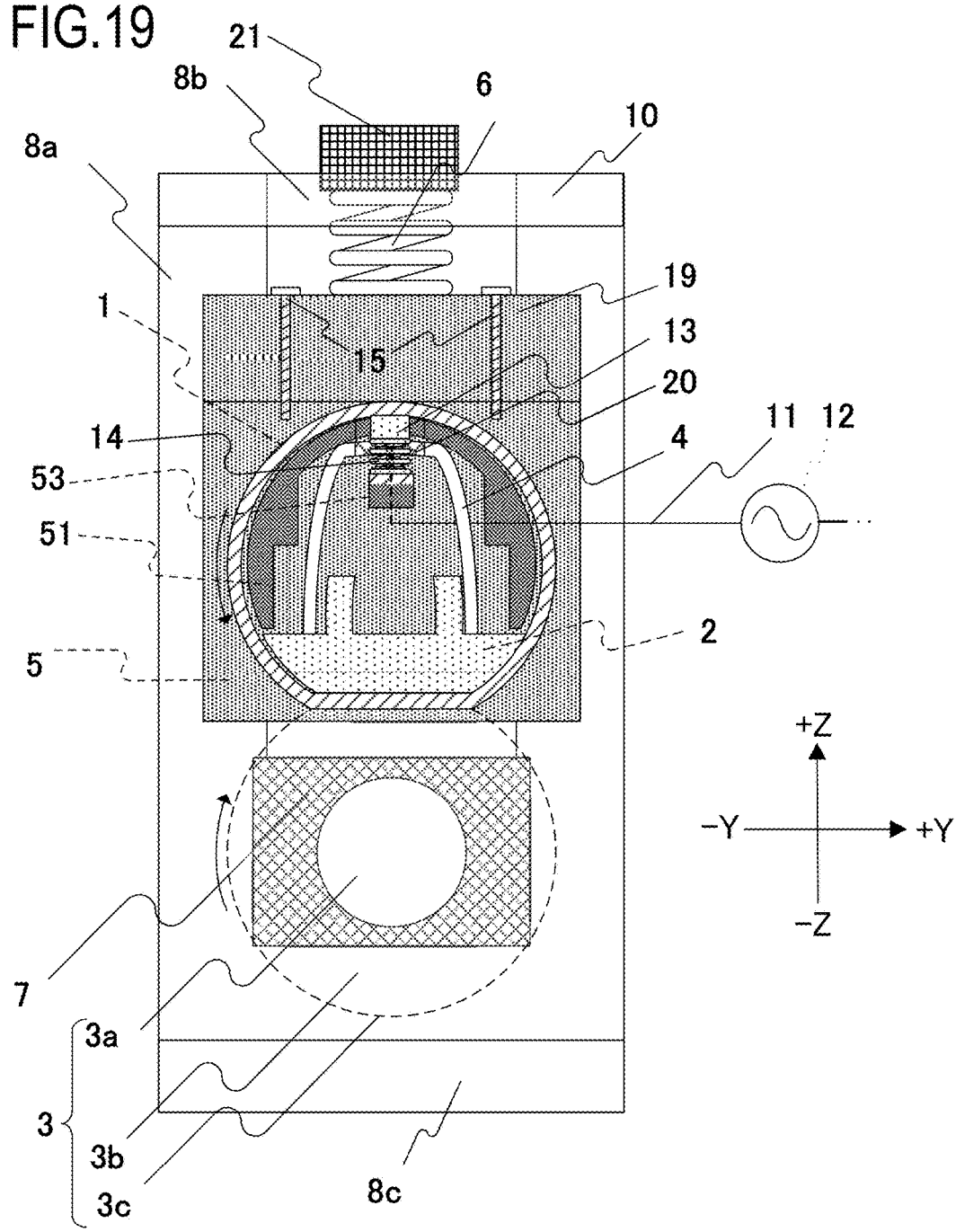
FIG. 19 is a cross-sectional schematic view of a vicinity of a longitudinal end portion in a pressure contact state according to a modification of the fourth embodiment.

FIG. 18 is a front schematic view of the fixing apparatus 100. In FIG. 18, a vicinity of a longitudinal end portion is depicted in detail and a longitudinal center portion is omitted. FIG. 19 is a cross-sectional schematic view of a vicinity of a longitudinal end portion of the fixing apparatus 100.

In the present embodiment, the block contact 13 is arranged on an inner surface of the film 1, and power feeding is performed from the inner surface of the film 1. A hole to be penetrated by the block contact 13 is provided in a portion of the reinforcing stay 4 and the flange 5, and the block contact comes into contact with the film 1 through the hole. In addition, an insulating member 20 is arranged in a hole of the reinforcing stay 4 to ensure insulation between the block contact 13 and the reinforcing stay 4. A spring seating surface of the contact spring 14, for pressing the block contact 13 against the film 1 from an inner peripheral side, comes into contact with a protruded portion 53 that protrudes from the flange 5. In addition, an opposed member 19, on an opposite side to the block contact 13 with respect to the film 1, is provided for the purpose of preventing deformation of the film 1. The opposed member 19 is responsible for reliably transmitting the pressing force of the block contact 13 to the film 1 and stabilizing power feeding. The opposed member 19 and the flange 5 are fixed by the fixing screw 15.

In the present embodiment, the block contact 13 and the contact spring 14 act as a contact member.

In addition, the flange 5 acts as a contact holding member in the present embodiment. Furthermore, total contact resistance of both ends at a contact surface of the block contact 13 and the film 1 in a pressure contact state of the fixing apparatus 100 was approximately 0.30 Ω.

Other configurations are similar to those of the second embodiment.

Description of Separating Operation of Fixing Apparatus

During a separating operation, since the film 1, the flange 5, the block contact 13, and the contact spring 14 move in an interlocked manner, the relative positional relationship between the block contact 13 and the contact spring 14, as a contact member, and the film 1 does not change. In addition, since the opposed member 19 also moves with the flange 5 in an interlocked manner, the relative positional relationship among the film 1, the block contact 13, and the opposed member 19 does not change.

Other operations are similar to those of the second embodiment.

Effect of Present Embodiment

In a similar manner to the second embodiment, with respect a distance L between the fulcrum point A, at which the contact spring 14 and the flange 5 come into contact with each other, and the contact point B between the block contact 13 and the film 1, L=L' is satisfied even in a separation state of the fixing apparatus 100 in the same manner as in a pressure contact state. In addition, since the opposed member 19 moves with the film 1, the flange 5, the block contact 13, and the contact spring 14 in an interlocked manner, the relative positional relationship among the film 1, the block contact 13, and the opposed member 19 is not changed by a pressure contact/separation operation of the fixing apparatus 100. Therefore, a pressing force by which the block contact 13 and the opposed member 19 clamp the film 1 does not change. At this point, total contact resistance of both ends at a contact surface of the block contact 13 and the film 1 was approximately 0.30Ω, which represents no change from the pressure contact state.

From the above arrangement, it was confirmed that, in a similar manner to the first to third embodiments, the configuration in which power feeding is performed from an inner surface of the film 1 has an operational effect in that the pressing force of the block contact 13 and the contact spring 14, as a contact member, with respect to the film 1, as a heating rotating member, does not decrease and the contact resistance does not increase.

While a leaf spring is used as a contact member in the first embodiment, a block contact and a contact spring, or a rotating member and a contact spring may be used instead. In addition, while a block contact and a contact spring are used as a contact member in the second embodiment, the modification of the second embodiment, and the fourth embodiment, a leaf spring, or a rotating member and a contact spring may be used instead. Furthermore, while a rotating member and a contact spring are used as a contact member in the third embodiment, a leaf spring, or a block contact and a contact spring may be used instead.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A fixing apparatus comprising:
   a heating rotating member that generates heat when energized;
   a pressure rotating member that forms a nip portion, together with the heating rotating member, in which a developer image, formed on a recording medium, is fixed to the recording medium while the recording medium is transported through the nip portion;
   a contact member that comes into contact with and feeds power to the heating rotating member;
   a contact holding member that holds the contact member so that the contact member presses against the heating rotating member, and that causes at least a portion of the contact member to elastically deform between the heating rotating member and the contact holding member; and
   a displacement mechanism that displaces a relative position of the heating rotating member with respect to the pressure rotating member,
   wherein, when the heating rotating member is separated from the pressure rotating member by the displacement mechanism, an interval between a fulcrum, at which the contact holding member holds the contact member, and a contact point, at which the contact member comes into contact with the heating rotating member, does not increase.

2. The fixing apparatus according to claim 1,
   wherein, when the heating rotating member is separated from the pressure rotating member by the displacement mechanism, the interval between the fulcrum and the contact point decreases.

3. The fixing apparatus according to claim 2,
   wherein the contact holding member is moved with the pressure rotating member in an interlocked manner by the displacement mechanism, and the contact holding member presses the contact member against the heating rotating member from a downstream side in a direction in which the heating rotating member is separated from the pressure rotating member by the displacement mechanism.

4. The fixing apparatus according to claim 3,
   wherein the contact holding member is provided on a member that supports the pressure rotating member.

5. The fixing apparatus according to claim 1,
   wherein, when the heating rotating member is separated from the pressure rotating member by the displacement mechanism, the interval between the fulcrum and the contact point does not change.

6. The fixing apparatus according to claim 1, wherein, when the heating rotating member is separated from the pressure rotating member by the displacement mechanism, the contact holding member moves with the heating rotating member in an interlocked manner.

7. The fixing apparatus according to claim 6, wherein the contact holding member is a member that supports the heating rotating member.

8. The fixing apparatus according to claim 6, wherein the contact holding member is a member bonded to a member that supports the heating rotating member.

9. The fixing apparatus according to claim 7, wherein the heating rotating member has a cylindrical shape, and
wherein the contact holding member presses the contact member against the heating rotating member from an outer peripheral side of the heating rotating member.

10. The fixing apparatus according to claim 7, wherein the heating rotating member has a cylindrical shape, and
wherein the contact holding member presses the contact member against the heating rotating member from an inner peripheral side of the heating rotating member.

11. The fixing apparatus according to claim 1, wherein the contact member is formed of a member with elasticity.

12. The fixing apparatus according to claim 11, wherein the contact member is formed of a leaf spring.

13. The fixing apparatus according to claim 1, wherein the contact member includes a coil spring.

14. The fixing apparatus according to claim 1, wherein the contact member includes a block contact that comes into sliding contact with the heating rotating member.

15. The fixing apparatus according to claim 1, wherein the contact member includes a member that comes into rotational contact with the heating rotating member.

16. An image forming apparatus comprising:
(A) an image forming portion that forms a developer image on a recording medium; and
(B) a fixing apparatus that includes:
  (a) a heating rotating member that generates heat when energized;
  (b) a pressure rotating member that forms a nip portion, together with the heating rotating member, in which a developer image, formed on a recording medium, is fixed to the recording medium while the recording medium is transported through the nip portion;
  (c) a contact member that comes into contact with and feeds power to the heating rotating member;
  (d) a contact holding member that holds the contact member so that the contact member presses against the heating rotating member, and that causes at least a portion of the contact member to elastically deform between the heating rotating member and the contact holding member; and
  (e) a displacement mechanism that displaces a relative position of the heating rotating member with respect to the pressure rotating member,
wherein, when the heating rotating member is separated from the pressure rotating member by the displacement mechanism, an interval between a fulcrum, at which the contact holding member holds the contact member, and a contact point, at which the contact member comes into contact with the heating rotating member, does not increase, and
wherein the fixing apparatus fixes developer image, formed on the recording medium by the image forming portion, on the recording medium.

* * * * *